US007474772B2

(12) United States Patent
Russo et al.

(10) Patent No.: US 7,474,772 B2
(45) Date of Patent: Jan. 6, 2009

(54) SYSTEM AND METHOD FOR A MINIATURE USER INPUT DEVICE

(75) Inventors: Anthony P. Russo, New York, NY (US); Mark J. Howell, San Jose, CA (US)

(73) Assignee: Atrua Technologies, Inc., Campbell, CA (US)

( * ) Notice: Subject to any disclaimer, the term of this patent is extended or adjusted under 35 U.S.C. 154(b) by 427 days.

(21) Appl. No.: 10/873,393

(22) Filed: Jun. 21, 2004

(65) Prior Publication Data

US 2005/0012714 A1   Jan. 20, 2005

Related U.S. Application Data

(60) Provisional application No. 60/482,607, filed on Jun. 25, 2003.

(51) Int. Cl.
  *G06K 9/00* (2006.01)
  *G06F 3/048* (2006.01)
(52) U.S. Cl. .................. 382/124; 345/157; 715/856
(58) Field of Classification Search ................ None
  See application file for complete search history.

(56) References Cited

U.S. PATENT DOCUMENTS

| 1,660,161 | A | 2/1928 | Hansen |
| 1,683,059 | A | 9/1928 | Van Deventer |
| 3,393,390 | A | 7/1968 | Louis |
| 3,610,887 | A | 10/1971 | Betzer ........................ 219/501 |
| 3,621,439 | A | 11/1971 | Newbery .................... 338/180 |
| 3,624,584 | A | 11/1971 | Ohno ........................... 338/69 |
| 3,863,195 | A | 1/1975 | Bowen ........................ 338/183 |
| 3,960,044 | A | 6/1976 | Nagai et al. ................... 84/1.01 |
| 3,997,863 | A | 12/1976 | Luce ............................ 338/69 |
| 4,152,304 | A | 5/1979 | Tadewald .................... 252/506 |
| 4,257,305 | A | 3/1981 | Friend et al. ................. 84/1.24 |

(Continued)

FOREIGN PATENT DOCUMENTS

DE    19606408 A1    8/1997

(Continued)

OTHER PUBLICATIONS

I-Control, PDS 3000 TM Product Brief *"Mobile Finger-Based Control Sensor"*, 2 pages, Jul. 2003.

(Continued)

*Primary Examiner*—Charles Kim
(74) *Attorney, Agent, or Firm*—Haverstock & Owens LLP

(57) ABSTRACT

A system and method of the present invention emulates electronic input devices such as a steering wheel, a mouse, a joystick, a navigation bar, a scroll wheel, and a pressure-sensitive button. The method comprises swiping a finger on a swipe sensor, calculating a difference between a first position of the finger on the swipe sensor and a second position on the swipe sensor, and translating the difference into a plurality of sets of signals. Each set of signals is used to emulate the signals generated by one of the electronic input devices. The method thus uses a single swipe sensor to emulate multiple electronic input devices. In a preferred embodiment, the system is used to control a display on a portable electronic device is coupled to or forms part of the portable electronic device.

50 Claims, 14 Drawing Sheets

U.S. PATENT DOCUMENTS

| | | |
|---|---|---|
| 4,273,682 A | 6/1981 | Kanomori .................. 252/511 |
| 4,333,068 A | 6/1982 | Kishel ........................ 338/158 |
| 4,419,653 A | 12/1983 | Waigand ..................... 338/114 |
| 4,438,158 A | 3/1984 | Eichelberger et al. ........ 427/101 |
| 4,479,392 A | 10/1984 | Froeb et al. ............... 73/862.68 |
| 4,604,509 A | 8/1986 | Clancy et al. ............ 200/159 B |
| 4,745,301 A | 5/1988 | Michalchik ................. 307/119 |
| 4,746,894 A | 5/1988 | Zeldman ....................... 338/99 |
| 4,765,930 A | 8/1988 | Mashimo et al. ............ 252/511 |
| 4,775,765 A | 10/1988 | Kimura et al. ................ 178/18 |
| 4,827,527 A | 5/1989 | Morita et al. ................... 382/4 |
| 4,833,440 A | 5/1989 | Wojtanek ..................... 338/114 |
| 4,878,040 A | 10/1989 | Tamura ....................... 338/158 |
| 4,933,660 A | 6/1990 | Wynne, Jr. ................... 338/114 |
| 4,933,976 A * | 6/1990 | Fishbine et al. ............. 382/127 |
| 4,952,761 A | 8/1990 | Viebrantz ................... 200/513 |
| 5,060,527 A | 10/1991 | Burgess .................. 73/862.68 |
| 5,068,638 A | 11/1991 | Bickely et al. .............. 338/114 |
| 5,162,775 A | 11/1992 | Kuramochi et al. ......... 338/114 |
| 5,164,697 A | 11/1992 | Kramer ....................... 338/69 |
| 5,296,835 A | 3/1994 | Nakamura .................. 338/130 |
| 5,376,913 A | 12/1994 | Pine et al. ................... 338/114 |
| 5,429,006 A | 7/1995 | Tamori .................. 73/862.046 |
| 5,499,041 A | 3/1996 | Brandenburg et al. ....... 345/174 |
| 5,610,993 A | 3/1997 | Yamamoto .................. 382/124 |
| 5,612,719 A | 3/1997 | Beernink et al. ............ 345/173 |
| 5,614,881 A | 3/1997 | Duggal et al. ............. 338/22 R |
| 5,621,318 A | 4/1997 | Jacobsen et al. ....... 324/207.22 |
| 5,644,283 A | 7/1997 | Grosse-Wilde et al. ........ 338/20 |
| 5,657,012 A | 8/1997 | Tait ............................. 341/20 |
| 5,675,309 A | 10/1997 | DeVolpi ...................... 338/68 |
| 5,689,285 A | 11/1997 | Asher ......................... 345/161 |
| 5,821,930 A | 10/1998 | Hansen ....................... 345/340 |
| 5,825,352 A | 10/1998 | Bisset et al. ................. 345/173 |
| 5,825,907 A | 10/1998 | Russo ....................... 382/124 |
| 5,828,773 A | 10/1998 | Setlak et al. | 
| 5,841,888 A | 11/1998 | Setlak et al. |
| 5,845,005 A | 12/1998 | Setlak et al. |
| 5,852,670 A | 12/1998 | Setlak et al. |
| 5,862,248 A | 1/1999 | Salatino et al. |
| 5,876,106 A | 3/1999 | Kordecki ..................... 362/29 |
| 5,880,411 A | 3/1999 | Gillespie et al. .......... 178/18.01 |
| 5,889,507 A | 3/1999 | Engle et al. ................. 345/161 |
| 5,903,225 A | 5/1999 | Schmitt et al. |
| 5,907,327 A | 5/1999 | Ogura et al. ................ 345/339 |
| 5,909,211 A | 6/1999 | Combs et al. ............... 345/172 |
| 5,910,286 A | 6/1999 | Lipskier |
| 5,912,612 A | 6/1999 | DeVolpi ...................... 338/95 |
| 5,920,640 A | 7/1999 | Salatino et al. |
| 5,940,526 A | 8/1999 | Setlak et al. |
| 5,943,052 A | 8/1999 | Allen et al. .................. 345/341 |
| 5,945,929 A | 8/1999 | Westra ........................ 341/34 |
| 5,949,325 A | 9/1999 | Devolpi ...................... 338/154 |
| 5,953,441 A | 9/1999 | Setlak |
| 5,956,415 A | 9/1999 | McCalley et al. |
| 5,963,679 A | 10/1999 | Setlak |
| 5,982,894 A | 11/1999 | McCalley et al. |
| 5,995,084 A | 11/1999 | Chan et al. .................. 345/173 |
| 5,999,084 A | 12/1999 | Armstrong .................. 338/114 |
| 6,011,589 A | 1/2000 | Matsuura et al. |
| 6,021,211 A | 2/2000 | Setlak et al. |
| 6,028,773 A | 2/2000 | Hundt |
| 6,047,281 A | 4/2000 | Wilson et al. |
| 6,047,282 A | 4/2000 | Wilson et al. |
| 6,057,540 A | 5/2000 | Gordon et al. .............. 250/221 |
| 6,057,830 A | 5/2000 | Chan et al. .................. 345/157 |
| 6,061,051 A | 5/2000 | Chan et al. .................. 345/173 |
| 6,061,464 A | 5/2000 | Leger |
| 6,067,368 A | 5/2000 | Setlak et al. |
| 6,069,970 A | 5/2000 | Salatino et al. |
| 6,070,159 A | 5/2000 | Wilson et al. |
| 6,088,471 A | 7/2000 | Setlak et al. |
| 6,088,585 A | 7/2000 | Schmitt et al. .............. 455/411 |
| 6,098,330 A | 8/2000 | Schmitt et al. |
| 6,135,958 A | 10/2000 | Mikula-Curtis et al. ..... 600/443 |
| 6,181,807 B1 | 1/2001 | Setlak et al. |
| 6,208,329 B1 | 3/2001 | Ballare ....................... 345/173 |
| 6,239,790 B1 | 5/2001 | Martinelli et al. ........... 345/174 |
| 6,248,655 B1 * | 6/2001 | Machida et al. ............. 438/597 |
| 6,256,012 B1 | 7/2001 | Devolpi ...................... 345/161 |
| 6,256,022 B1 | 7/2001 | Manaresi et al. |
| 6,259,804 B1 | 7/2001 | Setlak et al. ................ 382/124 |
| 6,278,443 B1 | 8/2001 | Amro et al. ................. 345/173 |
| 6,289,114 B1 | 9/2001 | Mainguet .................... 382/124 |
| 6,317,508 B1 | 11/2001 | Kramer et al. |
| 6,323,846 B1 | 11/2001 | Westerman et al. ......... 345/173 |
| 6,330,345 B1 | 12/2001 | Russo et al. ................ 382/115 |
| 6,337,918 B1 | 1/2002 | Holchan .................... 382/124 |
| 6,344,791 B1 | 2/2002 | Armstrong .................. 338/114 |
| 6,376,393 B1 | 4/2002 | Newton et al. |
| 6,400,836 B2 | 6/2002 | Senior |
| 6,404,323 B1 | 6/2002 | Schrum et al. ................ 338/92 |
| 6,404,900 B1 | 6/2002 | Qian et al. ................... 382/103 |
| 6,408,087 B1 * | 6/2002 | Kramer ....................... 382/124 |
| 6,437,682 B1 | 8/2002 | Vance ........................ 338/185 |
| 6,442,286 B1 | 8/2002 | Kramer |
| 6,459,804 B2 | 10/2002 | Mainguet .................... 382/124 |
| 6,483,931 B2 | 11/2002 | Kalnitsky et al. |
| 6,501,284 B1 | 12/2002 | Gozzini |
| 6,512,381 B2 | 1/2003 | Kramer |
| 6,515,488 B1 | 2/2003 | Thomas |
| 6,518,560 B1 | 2/2003 | Yeh et al. .................... 250/214 |
| 6,535,622 B1 | 3/2003 | Russo et al. ................ 382/124 |
| 6,546,122 B1 | 4/2003 | Russo ........................ 382/125 |
| 6,563,101 B1 * | 5/2003 | Tullis ....................... 250/208.1 |
| 6,580,816 B2 | 6/2003 | Kramer et al. |
| 6,603,462 B2 | 8/2003 | Matusis ...................... 345/173 |
| 6,628,812 B1 | 9/2003 | Setlak et al. |
| 6,654,484 B2 | 11/2003 | Topping ..................... 382/124 |
| 6,661,631 B1 | 12/2003 | Meador et al. ............. 361/93.1 |
| 6,664,951 B1 | 12/2003 | Fujii et al. ................... 345/173 |
| 6,667,439 B2 | 12/2003 | Salatino et al. |
| 6,668,072 B1 | 12/2003 | Hribernig et al. ........... 382/124 |
| 6,681,034 B1 | 1/2004 | Russo ........................ 382/125 |
| 6,683,971 B1 | 1/2004 | Salatino et al. |
| 6,744,910 B1 | 6/2004 | McClurg et al. ............ 382/124 |
| 6,754,365 B1 | 6/2004 | Wen et al. ................... 382/100 |
| 6,876,756 B1 | 4/2005 | Vieweg ....................... 382/124 |
| 6,961,452 B2 | 11/2005 | Fujii .......................... 382/125 |
| 7,002,553 B2 | 2/2006 | Shkolnikov ................. 345/169 |
| 7,003,670 B2 | 2/2006 | Heaven et al. .............. 713/186 |
| 7,020,270 B1 | 3/2006 | Ghassabian ................. 379/368 |
| 7,054,470 B2 | 5/2006 | Bolle et al. .................. 382/124 |
| 7,136,514 B1 | 11/2006 | Wong ........................ 382/124 |
| 7,197,168 B2 | 3/2007 | Russo ........................ 382/125 |
| 7,263,212 B2 | 8/2007 | Kawabe ...................... 382/124 |
| 7,280,679 B2 | 10/2007 | Russo ........................ 382/124 |
| 7,299,360 B2 | 11/2007 | Russo ........................ 713/182 |
| 7,369,688 B2 | 5/2008 | Ser et al. .................... 382/124 |
| 2001/0012036 A1 | 8/2001 | Giere et al. ................... 347/62 |
| 2001/0017934 A1 | 8/2001 | Paloniemi et al. ........... 382/107 |
| 2001/0026636 A1 | 10/2001 | Mainguet |
| 2001/0032319 A1 | 10/2001 | Setlak |
| 2001/0043728 A1 | 11/2001 | Kramer et al. |
| 2002/0054695 A1 | 5/2002 | Bjorn et al. ................. 382/124 |
| 2002/0109671 A1 | 8/2002 | Kawasome ................. 345/156 |
| 2002/0130673 A1 | 9/2002 | Pelrine et al. ............... 324/727 |
| 2002/0164057 A1 | 11/2002 | Kramer et al. |
| 2002/0186203 A1 | 12/2002 | Huang ....................... 345/157 |
| 2002/0188854 A1 | 12/2002 | Heaven et al. .............. 713/186 |
| 2003/0002718 A1 | 1/2003 | Hamid ....................... 382/124 |
| 2003/0016849 A1 | 1/2003 | Andrade .................... 382/124 |
| 2003/0021495 A1 | 1/2003 | Cheng ....................... 382/312 |
| 2003/0025606 A1 | 2/2003 | Sabatini |

| | | | | | | | |
|---|---|---|---|---|---|---|---|
| 2003/0028811 | A1 | 2/2003 | Walker et al. ............... 713/202 | WO | WO 01/94966 | A2 | 12/2001 |
| 2003/0035568 | A1 | 2/2003 | Mitev et al. .................. 382/124 | WO | WO 01/95305 | A1 | 12/2001 |
| 2003/0035572 | A1 | 2/2003 | Kalnitsky et al. | WO | WO 01/99035 | A2 | 12/2001 |
| 2003/0044051 | A1 | 3/2003 | Fujieda ....................... 382/124 | WO | WO 01/99036 | A2 | 12/2001 |
| 2003/0095691 | A1 | 5/2003 | Nobuhara et al. ........... 382/124 | WO | WO 02/15209 | A3 | 2/2002 |
| 2003/0108227 | A1 | 6/2003 | Philomin et al. | WO | WO 02/15267 | A2 | 2/2002 |
| 2003/0115490 | A1 | 6/2003 | Russo et al. ................. 713/202 | WO | WO 02/44998 | A1 | 6/2002 |
| 2003/0123714 | A1 | 7/2003 | O'Gorman et al. .......... 382/124 | WO | WO 02/069386 | A1 | 9/2002 |
| 2003/0126448 | A1 | 7/2003 | Russo ......................... 713/186 | WO | WO 02/071313 | A1 | 9/2002 |
| 2003/0135764 | A1 | 7/2003 | Lu ............................... 713/202 | WO | WO 02/073375 | A2 | 9/2002 |
| 2003/0214481 | A1 | 11/2003 | Xiong ......................... 345/157 | WO | WO 02/086800 | A1 | 10/2002 |
| 2003/0215116 | A1 | 11/2003 | Brandt et al. | WO | WO 02/093462 | A1 | 11/2002 |
| 2004/0014457 | A1 | 1/2004 | Stevens .................... 455/414.1 | WO | WO 02/095349 | A1 | 11/2002 |
| 2004/0042642 | A1 | 3/2004 | Bolle et al. .................. 382/115 | WO | WO 03/007127 | A2 | 1/2003 |
| 2004/0128521 | A1 | 7/2004 | Russo ......................... 713/186 | WO | WO 03/017211 | A2 | 2/2003 |
| 2004/0148526 | A1 | 7/2004 | Sands et al. ................. 713/202 | WO | WO 03/049011 | A1 | 6/2003 |
| 2004/0156538 | A1 | 8/2004 | Greschitz et al. ............ 382/124 | WO | WO 03/049012 | A2 | 6/2003 |
| 2004/0186882 | A1 | 9/2004 | Ting ............................ 709/202 | WO | WO 03/049016 | A2 | 6/2003 |
| 2004/0208348 | A1* | 10/2004 | Baharav et al. ............. 382/124 | WO | WO 03/049104 | A1 | 6/2003 |
| 2004/0252867 | A1 | 12/2004 | Lan et al. ..................... 382/124 | WO | WO 03/075210 | A2 | 9/2003 |
| 2004/0258282 | A1 | 12/2004 | Bjorn et al. ................. 382/124 | | | | |
| 2004/0263479 | A1 | 12/2004 | Shkolnikov ................. 345/169 | | | | |
| 2005/0012714 | A1 | 1/2005 | Russo et al. ................. 345/157 | | | | |
| 2005/0041885 | A1 | 2/2005 | Russo ......................... 382/289 | | | | |
| 2005/0169503 | A1 | 8/2005 | Howell et al. ............... 382/115 | | | | |
| 2005/0179657 | A1 | 8/2005 | Russo et al. ................. 345/163 | | | | |
| 2005/0259851 | A1 | 11/2005 | Fyke ........................... 382/124 | | | | |
| 2005/0259852 | A1 | 11/2005 | Russo ......................... 382/124 | | | | |
| 2006/0002597 | A1 | 1/2006 | Rowe .......................... 382/124 | | | | |
| 2006/0034043 | A1 | 2/2006 | Hisano et al. ............... 361/681 | | | | |
| 2006/0078174 | A1 | 4/2006 | Russo ......................... 382/121 | | | | |
| 2006/0103633 | A1 | 5/2006 | Gioeli ......................... 345/173 | | | | |
| 2006/0242268 | A1 | 10/2006 | Omernick et al. ........... 709/219 | | | | |
| 2006/0280346 | A1 | 12/2006 | Machida ..................... 382/124 | | | | |
| 2007/0014443 | A1 | 1/2007 | Russo ......................... 382/124 | | | | |
| 2007/0034783 | A1 | 2/2007 | Eliasson et al. ............. 250/221 | | | | |
| 2007/0061126 | A1 | 3/2007 | Russo et al. .................... 703/2 | | | | |
| 2007/0125937 | A1 | 6/2007 | Eliasson et al. ............. 250/221 | | | | |
| 2007/0274575 | A1 | 11/2007 | Russo ......................... 382/124 | | | | |
| 2008/0013808 | A1 | 1/2008 | Russo et al. ................. 382/125 | | | | |

FOREIGN PATENT DOCUMENTS

| | | |
|---|---|---|
| EP | 1 113 383 A2 | 7/2001 |
| EP | 1 113 405 A2 | 7/2001 |
| EP | 1 143 374 B1 | 2/2005 |
| JP | 09071135 | 3/2007 |
| WO | WO 98/15225 | 4/1998 |
| WO | WO 98/52145 | 11/1998 |
| WO | WO 98/52146 | 11/1998 |
| WO | WO 98/52147 | 11/1998 |
| WO | WO 98/52157 | 11/1998 |
| WO | WO 99/43258 | 9/1999 |
| WO | WO 00/68873 | 11/2000 |
| WO | WO 00/68874 | 11/2000 |
| WO | WO 00/72507 A1 | 11/2000 |
| WO | WO 01/09819 A1 | 2/2001 |
| WO | WO 01/09936 A1 | 2/2001 |
| WO | WO 01/29731 A1 | 4/2001 |
| WO | WO 01/39134 A3 | 5/2001 |
| WO | WO 01/65470 A1 | 9/2001 |
| WO | WO 01/73678 A1 | 10/2001 |
| WO | WO 01/77994 A1 | 10/2001 |
| WO | WO 01/80166 A3 | 10/2001 |
| WO | WO 01/94892 A3 | 12/2001 |
| WO | WO 01/94902 A2 | 12/2001 |

OTHER PUBLICATIONS

Biometrics, "*A Responsive Supply Chain*", By Andrew Conry-Murray, 5 pages, posted Jul. 7, 2002, as printed Aug. 23, 2004, at http://www.networkmagazine.com/shared/article/ ID-17601104.

Ballard and Brown, "*Computer Vision*", Prentice Hall, 1982, pp. 66-69.

S. Shigematsu et al., "A Single-Chip Fingerprint Sensor and Identifier", IEEE Journal of Solid-State Circuits, vol. 34, No. 12, Dec. 1999, pp. 1852-1859.

"*Fingernail Touch Sensors: Spatially Distributed Measurement and Hemodynamic Modeling*", Stephen Mascaro and H. Harry Asada, 2000 IEEE, pp. 3422-3427.

Jacob O. Wobbrock, Brad A. Myers, Htet Htet Aung, and Edmond F. LoPresti, Text Entry from Power Wheelchairs: EdgeWrite for Joysticks and Touchpads, pp. 110-117, Human-Computer Interaction Institute School of Computer Science Carnegie Mellon University, Pittsburg, PA 15213 USA.

Bartholomew J. Kane, "A High Resolution Traction Stress Sensor Array For Use In Robotic Tactile Determination", A Dissertation Submitted to the Department of Mechanical Engineering and the Committee on Graduate Studies of Stanford University in Partial Fulfillment of the Requirements for the Degree of Doctor of Philosophy, Sep. 1999.

Choonwoo Ryu et al. "Super-template Generation Using Successive Bayesian Estimation for Fingerprint Enrollment", Jan. 2005 Springer-Verlag Berlin Heidelberg, pp. 710-719.

Dongjae Lee et al. "Fingerprint Fusion Based on Minutiae and Ridge for Enrollment", Jan. 2003 Springer-Verlag Berlin Heidelberg, pp. 478-485.

Koichi Sasakawa et al. "Personal Verification System with High Tolerance of Poor Quality Fingerprints", May 1990 Machine Vision Systems Integration in Industry, p. 265272.

Michal Irani et al. "Improving Resolution by Image Registration", May 1991 by Academic Press, Inc., pp. 231-239.

Qinfen Zheng et al. "A Computational Vision Approach to Image Registration", Aug. 1992 IEEE, pp. 193-197.

Wei-Yun Yau et al. "Fingerprint Templates Combination", Jan. 2004 Springer-Verlag Berlin Heidelberg, pp. 449-460.

Xudong Jiand et al. "Detecting the Fingerprint Minutiae by Adaptive Tracing the Gray-Level Ridge", May 2001, pp. 999-1013, Published by Elsevier Science Ltd.

Xudong Jiang et al. "Fingerprint Minutiae Matching Based on the Local and Global Structures", Sep. 2000 Ieee, pp. 1038-1041.

* cited by examiner

SYSTEM AND METHOD FOR A MINIATURE USER INPUT DEVICE

RELATED APPLICATION

This application claims priority under 35 U.S.C. § 119(e) of the co-pending U.S. provisional patent application Ser. No. 60/482,607, filed on Jun. 25, 2003, and titled "SYSTEM AND METHOD FOR A MINIATURE USER INPUT DEVICE." The provisional patent application Ser. No. 60/482,607, filed on Jun. 25, 2003, and titled "SYSTEM AND METHOD FOR A MINIATURE USER INPUT DEVICE" is hereby incorporated by reference.

FIELD OF THE INVENTION

This invention relates to user input devices. More specifically, this invention relates to biometric sensors used to emulate input devices for portable electronic computing platforms.

BACKGROUND OF THE INVENTION

The emergence of portable electronic computing platforms allows functions and services to be enjoyed wherever necessary. Palmtop computers, Personal Digital Assistants, mobile telephones, portable game consoles, biometric/health monitors, and digital cameras are some everyday examples of portable electronic computing platforms. The desire for portability has driven these computing platforms to become smaller and thus have a longer battery life.

It is difficult to efficiently collect user input on these ever-smaller devices. Portable electronic computing platforms need these user inputs for multiple purposes including, but not limited to, navigation: moving a cursor or a pointer to a certain location on a display; selection: choosing, or not choosing, an item or an action; and orientation: changing direction with or without visual feedback.

Prior art systems have borrowed concepts for user input from much larger personal computers. Micro joysticks, navigation bars, scroll wheels, touch pads, steering wheels and buttons have all been adopted, with limited success, in today's portable electronic computing platforms. All of these devices consume substantial amounts of valuable surface real estate on a portable device. Mechanical devices such as joysticks, navigation bars and scroll wheels can wear out and become unreliable. Because they are physically designed for a single task, they typically do not provide functions of other navigation devices. Their sizes and required movements often preclude optimal ergonomic placement on portable computing platforms. Moreover, these smaller versions of their popular personal computer counterparts usually do not offer accurate or high-resolution position information, since the movement information they sense is too coarsely grained.

A finger image sensor detects and measures features (e.g., valleys, ridges, and minutiae) on the surface of a finger through capacitive, thermal, optical, or other sensing technologies. Most commercially available finger image sensors fall into two categories: (1) full-size placement sensors and (2) typically smaller so-called swipe sensors. Placement sensors have an active sensing surface that is large enough to accommodate most of the interesting part of a finger at the same time. Generally, they are rectangular in shape with a sensing surface area of at least 100 mm². The finger is held stationary while being imaged on the full-placement sensor.

The other type of finger image sensor, called a swipe sensor, is characterized by a strip-like imaging area that is fully sized in one direction (typically in length) but abbreviated in the other (typically width). An example is the Atrua Wings ATW100 sensor, as described by Andrade in US Patent Application 20030016849 and PCT patent application WO 02/095349. A finger is swiped across the sensor until all parts of it are imaged, analogous to how a feedthrough paper document scanner operates. A sequence of slices or frames of the finger image is captured and processed to construct a composite image of the finger.

Several prior art devices use a touchpad for authenticating a user and moving a cursor on a display device. A touchpad, which operates similarly to a finger image sensor, does not provide enough image resolution or capability to distinguish ridges and valleys on the fingerprint. Instead, the touchpad perceives a finger as a blob and tracks the blob location to determine movement. Therefore, a touchpad cannot follow miniscule movements, nor can it feasibly detect rotational movement.

U.S. Patent Publication No. 2002/0054695A1, titled "Configurable Multi-Function Touchpad Device," to Bjorn et al. discloses a touchpad that can be configured to authenticate a user or to control a cursor. The touchpad attempts to enhance the function of a touchpad to include fingerprint capability. It merely absorbs the hardware of a capacitive finger image sensor into the much-larger size touchpad to achieve cost-savings. It does not disclose using the finger image data for navigation control. Undoubtedly, its large size still precludes the touchpad from being used in most portable electronic computing platforms.

U.S. Pat. No. 6,408,087, titled "Capacitive Semiconductor User Input Device," to Kramer discloses a system that uses a fingerprint sensor to control a cursor on the display screen of a computer. The system controls the position of a pointer on a display according to detected motion of the ridges and pores of the fingerprint.

The system has a number of limitations. It uses image-based correlation algorithms and, unlike a system using a swipe sensor, requires fingerprint images with multiple ridges, typical for capacitive placement sensors. To detect a motion parallel to the direction of a ridge, the system requires the sensor to detect pores, a requirement restricting its use to high-resolution sensors of at least 500 dpi. The system detects changes in ridge width to sense changes of finger pressure. However, ridge width measurement requires a very high-resolution sensor to provide low-resolution of changes of finger pressure. The algorithm is unique to emulating a mouse and is not suitable for emulating other types of input devices, such as a joystick or a steering wheel, where screen movements are not always proportional to finger movements. For example, a joystick requires a returning to home position when there is no input and a steering wheel requires rotational movement. The system is unique to capacitive sensors where inverted amplifiers are associated with every sensor cell.

BRIEF SUMMARY OF THE INVENTION

Embodiments of the present invention generate inputs for controlling a display, without the need for mechanical parts. In the preferred embodiment of the method, a fingerprint sensor is used to emulate user input devices for an electronic device, such as a portable electronic device. The user input devices include, but are not limited to, a steering wheel, a mouse, a joystick, a navigation bar, and a scroll wheel. The system of the preferred embodiment has a smaller footprint than its mechanical counterparts and, because it does not use mechanical parts, is less prone to wear and ultimate failure.

In a first aspect of the present invention, a method comprises calculating a difference between first patterned image data and second patterned image data and translating the difference into a set of signals. The set of signals correspond to one or more signals used to emulate any one of a plurality of electronic input devices. Preferably, the first patterned image data corresponds to an image of a biometric object at a first position and the second patterned image data corresponds to the image of the biometric object at a second position.

In another embodiment, the method further comprises reading the image of the biometric object at the first position and reading the image of the biometric object at the second position. Preferably, the biometric image data comprises finger image data related to a fingerprint image. Also preferably, reading the image of the biometric object at the first and second positions both comprise swiping a finger across a finger swipe sensor. Alternatively, reading the image of the biometric object at the first and second positions comprises placing a finger onto a finger placement sensor.

In another embodiment, calculating a difference comprises sensing a presence of a finger on a finger sensor and calculating a linear difference between the image of the biometric object at the first position and the image of the biometric object at second position using a row-based correlation. One set of signals can correspond to output signals of a computer mouse for controlling an onscreen pointer. In this embodiment, the method further comprises non-linearly scaling the linear difference with a scaling factor. In one embodiment, non-linearly scaling comprises smoothing the linear difference. The scaling factor is determined dynamically, based on a pre-determined number of positions of the finger on the finger sensor. Non-linearly scaling further comprises median filtering and exponentially filtering the linear difference In another embodiment, one set of signals corresponds to the output signals of a scroll wheel for controlling an onscreen object. In this embodiment, translating the difference into a set of signals comprises translating the linear difference into a direction of movement of the finger on the finger sensor using one or more non-linear scaling functions and generating the set of signals when the finger is detected on the finger sensor corresponds to selecting an item indicated by a scroll wheel.

In another embodiment, one set of signals corresponds to the output signals of a navigation bar for controlling an onscreen object. In this embodiment, translating the difference into the one set of signals comprises comparing the linear difference in a direction to a pre-determined threshold, the direction being one of a plurality of directions controllable by a navigation bar, generating signals corresponding to the movement of the onscreen object by a unit of motion in a direction controllable by the navigation bar when the linear difference exceeds the threshold, and repeating these steps for the remaining plurality of directions controllable by the navigation bar.

In another embodiment, one set of signals corresponds to output signals of a joystick for controlling an onscreen object. In this embodiment, translating the difference into the one set of signals comprises translating the linear difference into a direction of movement of the finger on the finger sensor using non-linear scaling and generating a signal corresponding to moving the onscreen object to a home position on a display when a finger is not detected on the finger sensor. In this embodiment, generating a signal corresponding to moving the onscreen object to a home position on a display comprises generating a signal that simulates a spring-mass-damper system that decreases a velocity of the onscreen object. Alternatively, or additionally, the spring-mass-damper system overshoots the home position, oscillates around it, or both. Sensing a presence of the finger comprises measuring a pressure applied by the finger on the finger sensor. Measuring a pressure applied by the finger comprises computing the weighted average of regional finger presence data, smoothed average of finger image data, and smoothed variance of the finger image data. And generating a signal corresponding to moving the object to a home position comprises generating a signal corresponding to a damping signal at a rate related to a reduced pressure on the finger sensor.

In another embodiment, one set of signals corresponds to the output signals of a steering wheel for controlling an object on a display. In this embodiment, calculating the linear difference comprises estimating a rotational movement of a finger on the finger sensor. Translating the difference into the one set of signals comprises converting the rotational movement to an angle of rotation for the onscreen object and generating a signal corresponding to returning the onscreen object to a home position on the display in the event that the finger is not present on the finger sensor. Generating a signal corresponding to returning the onscreen object to the home position on the display comprises generating a signal corresponding to a spring-mass-damper system that decreases in velocity. Alternatively, or additionally, the spring-mass-damper system overshoots the home position, oscillates around it, or both. Sensing the presence of the finger further comprises measuring a pressure applied by the finger on the sensor. Generating a signal corresponding to returning the onscreen object to the home position on the display comprises generating a damping signal corresponding to a reduction on the amount of pressure applied by the finger on the finger sensor.

In another embodiment, sensing the presence of a finger on the finger sensor comprises tracking fluctuations of smoothed variance of the finger image data.

In another embodiment, the method further comprises transmitting a set of signals from the plurality of sets of signals to a display, thereby controlling an onscreen object on the display. The display forms part of a host device, the host device selected from the group consisting of a portable computer, a personal digital assistant, a portable telephone, a portable gaming device, a biometric/health monitor, and a digital camera.

In a second aspect of the invention, a method comprises determining a difference between first patterned image data and second patterned image data and using the difference to concurrently control a plurality of onscreen objects.

In a third aspect of the present invention a system for controlling a movement of an onscreen object comprises a means for reading patterned images and generating raw finger image data; a means for converting raw patterned image data into movement information, the means for converting raw patterned image data coupled to the means for reading patterned images, and a means for converting the finger movement information into sets of computer input device signals for controlling movement of the onscreen object. The means for converting movement information is coupled to the means for converting raw patterned image data.

DETAILED DESCRIPTION OF THE INVENTION

Figure 1:
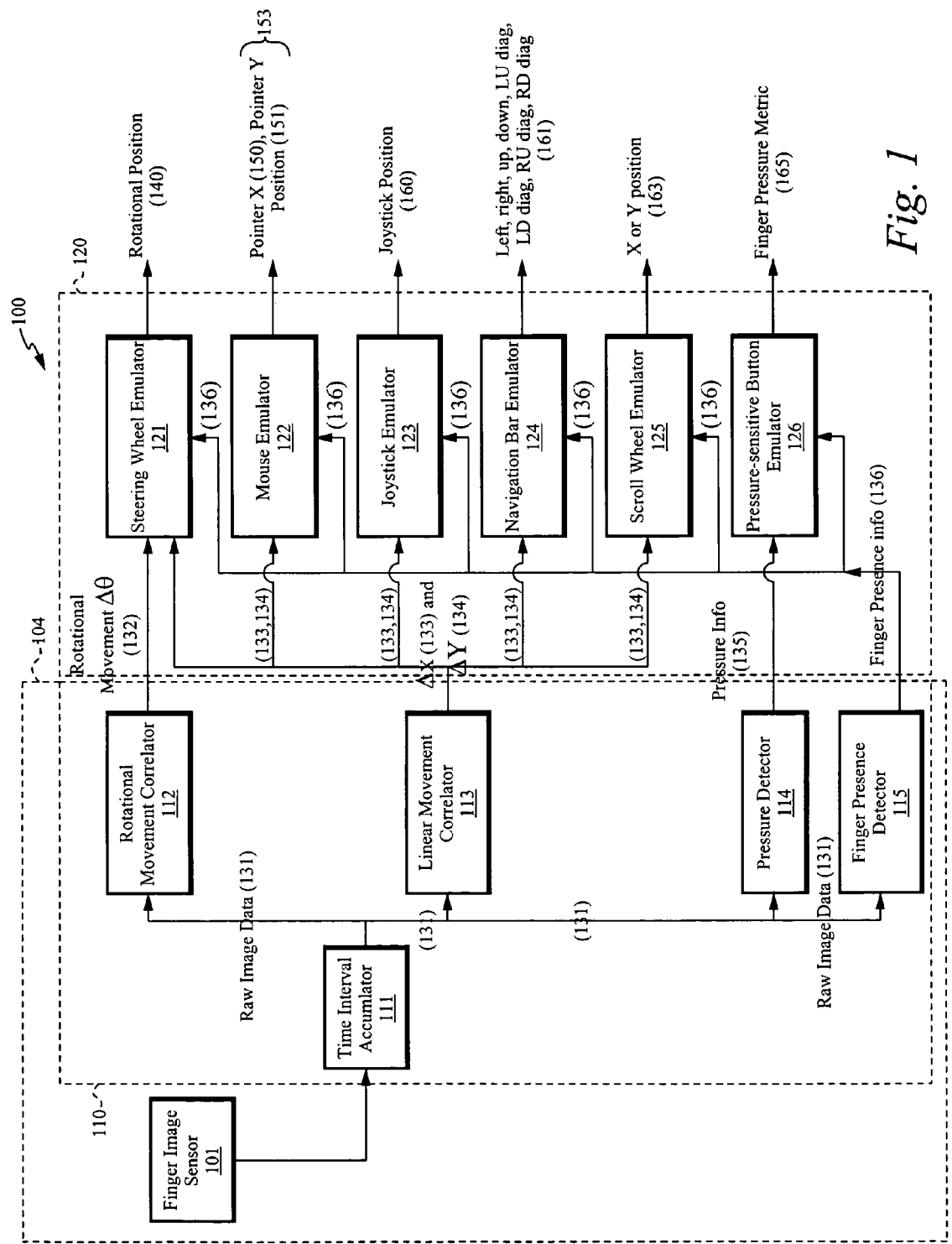
FIG. 1 is a block diagram of a system for emulating input devices in accordance with the present invention.

In accordance with the present invention, finger movement is tracked on a swipe finger image sensor to emulate more traditional devices including, but not limited to, mouse pointers, navigation bars, joysticks, scroll wheels, steering wheels, and pressure-sensitive buttons. The invention uses finger image sensors of any technology to capture finger image data, including but not limited to ridges, valleys, and minutiae, to generate user inputs for portable electronic computing platforms. By detecting the presence of a finger, its rotational and linear movements, its exerted pressure and time relationship among all these data, embodiments of the invention can emulate any number of navigation devices using a single physical finger image sensor, with no moving parts that can wear out.

Thus, in accordance with the invention, multiple input devices can be emulated without additional hardware; one or more input devices can function simultaneously; the method works on any sensor or sensor type, but preferably a swipe sensor given its small size; the system has no mechanical moving parts that can wear out; the sensor, given its small size, is able to be placed almost anywhere on a portable device, allowing device designers to consider new form factors and place the sensor for user input at ergonomically optimal locations; the system and method allow for high-resolution output so that a small finger movement is sufficient to generate a large movement of the input devices; user authentication can be optionally provided; the system costs less that other systems because multiple input devices and user authentication can be implemented together; the system allows for the savings of computational resources on a host platform when instruments are implemented in dedicated hardware logic integrated with the finger image sensor; and low resolution sensors of 250 or less dpi can be used to either reduce the cost or improve sensitivity.

The system of the preferred embodiment comprises a number of components for processing finger image sensor information, called instruments. Each instrument is configured to receive image data and generate information relating to a change in the position of an image. The information relating to a change in the position of a data is transmitted to an emulator unit, which then generates analog signals similar to those generated by an electronic input device, such as a joystick, a steering wheel, a mouse, a navigation bar, and a scroll wheel. The signals are coupled to a host device and are used to control a display on the host device. The host device is any electronic platform including a portable electronic platform such as a portable telephone, a PDA, and a laptop computer.

Thus, as one example, a user can swipe her finger on a swipe sensor or a placement sensor coupled to or forming part of a portable telephone, thereby emulating a scroll wheel that scrolls through a list of telephone numbers displayed on the telephone's display screen. The user can then use her finger to tap, press more firmly on, or perform some other action on the swipe sensor to select a highlighted telephone number. As used herein, any action that can be performed and recognized on a sensor to emulate a function is an event.

Swipe sensors are used for the preferred embodiment, not only because they are better suited for portable devices but also because they produce smaller images. The smaller images have less data in them, making the computations less intense. While it is possible to ignore or mask off data from a larger sensor to make it resemble a smaller one, this method is not ideal because it will not guarantee that the user's finger is even touching the area of interest. With a swipe device, this is not an issue.

As used herein, a device that produces a sequence of measurements is called a finger image sensor. Each such strip-shaped measurement is called a frame. A frame or a sequence of frames may also be referred to as image data or fingerprint image data. While the examples below use a swipe sensor when describing embodiments of the invention, it will be appreciated that placement sensors producing larger finger image measurements can also be used in accordance with the present invention.

In accordance with other embodiments of the present invention, images other than fingerprint images are used to generate information for emulating electronic input devices such as mouse pointers, navigation bars, joysticks, scroll wheels, steering wheels and pressure-sensitive buttons. In one embodiment, a patterned material is placed on a sensor and slid, rotated, pressed more or less firmly, or otherwise moved. The patterned material can, for example, be a glove or other surface containing a patterned image. Information corresponding to a movement of the patterned image is then generated and used to emulate an electronic input device. In another embodiment, a stylus, such as one used to input data on a personal digital assistant, is used to generate data points on a touch screen. The data points correspond to a patterned image in a first position and a second position, whose difference is also used to emulate an electronic input device. It will be appreciated that data points corresponding to patterned images can be produced, captured, and used to emulate electronic input devices in many ways in accordance with the present invention.

FIG. 1 illustrates a preferred embodiment of a system 100 in accordance with the present invention. The system 100 comprises a swipe sensor 101 coupled to a group of instruments 110, which is in turn coupled to a computing platform 120. In operation, the swipe sensor 101 reads a fingerprint image and transmits a portion of the image data or information related to the image (collectively, "image data") to the group of instruments 110. The group of instruments 110 uses the portion of the image data to generate position information, such as the angle that the finger has rotated on the swipe sensor 101. The computing platform 120 translates the position information into device emulation data.

The group of instruments 110 comprises a Time Interval Accumulator 111 coupled to a Rotational Movement Correlator 112, a Linear Movement Correlator 113, a Pressure detector 114, and a Finger Presence Detector 115. It will be appreciated that while the group of instruments 110 is depicted as having the components 111, 112, 113, 114, and 115, embodiments of the system can have any combination of these components, depending on the application at hand. For example, if the system 100 is designed only to emulate a navigation bar, as described below, only the Linear Movement Correlator 113 and the Finger Presence Detector 115 are required for the Group of Instruments 110.

The Time Interval Accumulator 111, if available, will be implemented in hardware either integrated with the swipe sensor 101 or into another hardware component. The other instruments including the Rotational Movement Correlator 112, the Linear Movement Correlator 113, the Pressure Detector 114, and the Finger Presence Detector 115 may be partially or fully implemented in hardware integrated with the swipe sensor 101 or into another hardware component. Alternatively, these instruments may be implemented in software on the computing platform 120. The swipe sensor 101 and the integrated instruments implemented in hardware are collectively called the sensor logic 104. In alternative embodiments, the swipe sensor 101 is replaced with a placement sensor.

The computing platform 120, which represents the host portable computing platform, has a central processing unit and a memory that together form one or more device emulation units used to emulate user input devices. The computing platform 120 comprises a Steering Wheel Emulator unit 121 with a rotational position output 140, a Mouse Emulator unit 122 with a mouse output 153 comprising a pointerX output 150 and a pointerY output 151, a Joystick Emulator unit 123 with a joystick position output 160, a Navigation Bar Emulator unit 124 with a navigation output 161, a Scroll Wheel Emulator unit 125 with an scroll wheel output 163, and a Pressure-sensitive Button Emulator unit 126 with a Pressure-Metric output 165. Each of the emulator units 121-126 has a first input coupled to the Finger Presence Detector 115. Each of the emulator units 121-125 has a second input coupled to the Linear Movement Correlator 113. The Steering Wheel Emulator unit 121 has a third input coupled to the Rotational Movement Correlator 112. The Pressure-sensitive Button Emulator unit 126 has a second input coupled to the Pressure Detector 114.

In one embodiment, the system 100 generates signals on all of the outputs 140, 153, 160, 161, 163, and 165. Each generated signal on the outputs 140, 153, 160, 161, 163, and 165 corresponds to the signal generated by a respective electronic input device. Thus, the signal generated on the rotational position output 140 corresponds to the signals generated by a steering wheel which, when received by a computer system (e.g., host device) is used to control a display. Similarly, the signals generated on the mouse output 153 correspond to the signals generated by a computer mouse; the signal generated on the joystick position output 160 corresponds to the signal generated by a computer joystick; the signals generated on the navigation output 161 correspond to the signals generated by a computer joystick; the signal generated on the scroll wheel output 163 corresponds to the signal generated by a computer scroll wheel; and the signal generated on the PressureMetric output 165 corresponds to the signal generated by a pressure sensitive button.

As used herein, a reference to an output will refer both to the output line and the signal on that line, depending on the context.

Not all of these output lines 140, 153, 160, 161, 163, and 165 need be used in accordance with the present invention. For example, if only a joystick is used to control a display on the host device, only the joystick position output 160 will be coupled to the host device to control the display. Alternatively, the system 100 or the host device has a switch that selectively couples one or more of the outputs 140, 153, 160, 161, 163, and 165 to the host system to provide signals that emulate one or more input devices. It will be appreciated that this switch (not shown) can be implemented in hardware, software, or a combination of both.

The swipe sensor 101 captures raw image data 131, which is sent through the Time Interval Accumulator 111 to various instruments, including the Rotational Movement Correlator 112, the Linear Movement Correlator 113, the Pressure Detector 114, and the Finger Presence Detector 115. As used herein, the terms "raw fingerprint image data", "raw image data", or "raw data" all refer to fingerprint image data before it has been processed, such as by smoothing, as described below.

As described in more detail below, the Rotational Movement Correlator 122 takes successive frames of image data and uses correlation methods to translate them into an angle of rotation generated on its output line 132. As used herein, all the output lines and the signals (e.g. representing an angle of rotation, linear displacement, etc.) will be referred to by the same reference numeral. The Rotational Movement Correlator 112 extracts the Rotational Movement $\Delta\Theta$ 132 and transmits it to the Steering Wheel Emulator unit 121. The Linear Movement Correlator 113 takes successive frames of image data and uses correlation methods to translate them into linear motion in both an X direction ($\Delta X$) and a Y direction ($\Delta Y$). The Linear Movement Correlator 113 extracts movements $\Delta X$ 133 and $\Delta Y$ 134 for the Mouse Emulator unit 122, the Joystick Emulator unit 123, the Navigation Bar Emulator unit 124, and the Scroll Wheel Emulator unit 125.

The Finger Presence Detector 115 detects the presence of a finger and transmits the Finger Presence Information 136 to all the emulators 121-126. The Pressure Detector 114 transmits the Pressure Information to the Pressure-sensitive Button Emulator unit 126.

The system 100 has the ability to emulate only one input device (single-mode) or multiple devices (multi-mode). In multi-mode operation, the swipe sensor 101 and related instruments, either simultaneously or at different points in time, emulate two or more devices. In one example, the system 100 emulates a joystick in a game, but emulates a scroll wheel between games for game selection. As another example, in a racecar game the system 100 emulates both a joystick for direction control and a pressure-sensitive button for acceleration and braking.

The Finger Presence Detector 115 analyzes the image data to determine whether a finger is present. Detecting finger presence at any given moment is a complex task, made difficult by many contributing factors. Inherent sensor noise, sensor-to-sensor variation, residue on the sensor's surface and the sensor's ability to sense a finger that is hovering close to the device without touching it are all issues accounted for, as described below.

Embodiments of the invention use frame statistics to detect finger motion. One embodiment of the present invention ensures noise immunity by heavily smoothing the instantaneous frame statistics. The most useful statistic is the variance of a given frame, which can be calculated using all the pixels in the frame or a well-chosen subset for efficiency purposes. In the preferred embodiment, a well-chosen subset of all the pixels in the center row of the image frame is used. The variance for the i$^{th}$ frame is denoted Var(i). The exponential smoothing used is well-known in the art. The smoothed variance SmoothVar(i) at any frame i is given by Equation (1):

$$\text{SmoothVar}(i)=fac*\text{SmoothVar}(i-1)+(1-fac)*\text{Var}(i) \quad \text{[Equation 1]}$$

where fac can be any value between 0 and 1, depending on how much smoothing is desired. Preferably, fac=0.9. SmoothVar(0) is defined as Var(0). Var(i) and SmoothVar(i) can both range between 0 and 128 for 8-bit pixel data.

Figure 2:
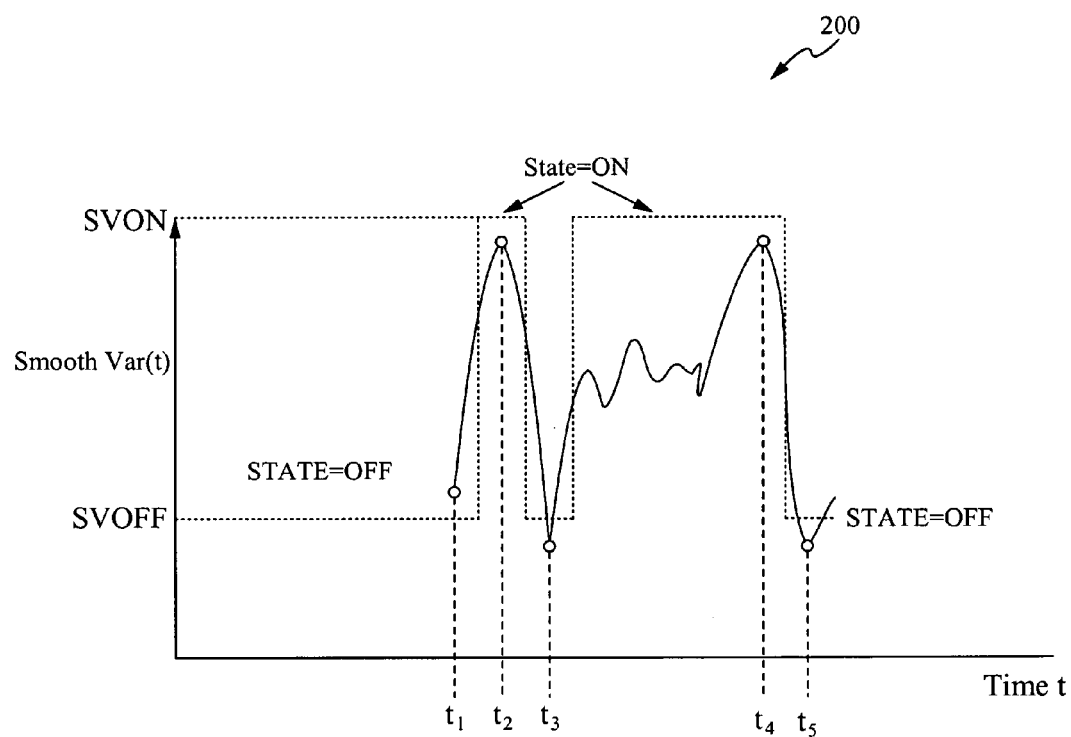
FIG. 2 is a graph showing fluctuations of smoothed variance of finger image data in accordance with the present invention.

To determine at any given instant whether a finger is present on the sensor, the invention makes use of context in the form of history of the variance as illustrated by the graph 200 in FIG. 2. The graph 200 depicts time t on a horizontal axis and SmoothVar, a function of time t on the vertical axis. The graph 200 also shows SmoothVar values SVON and SVOFF. When SmoothVar at a specific time is within a predetermined amount from SVON, the system detects that a finger is on the swipe sensor 101. Similarly, when SmoothVar at a specific time is within a predetermined amount from SVOFF, the system detects that a finger is not on the swipe sensor 101. The graph 200 shows that at time t1, t3, and t5, the system 100 determines that a finger is not on the swipe sensor 101, and at times t2 and t4 the system 100 determines that a finger is on the swipe sensor 101. These determinations are more clearly explained in reference to FIG. 3.

Figure 3A:
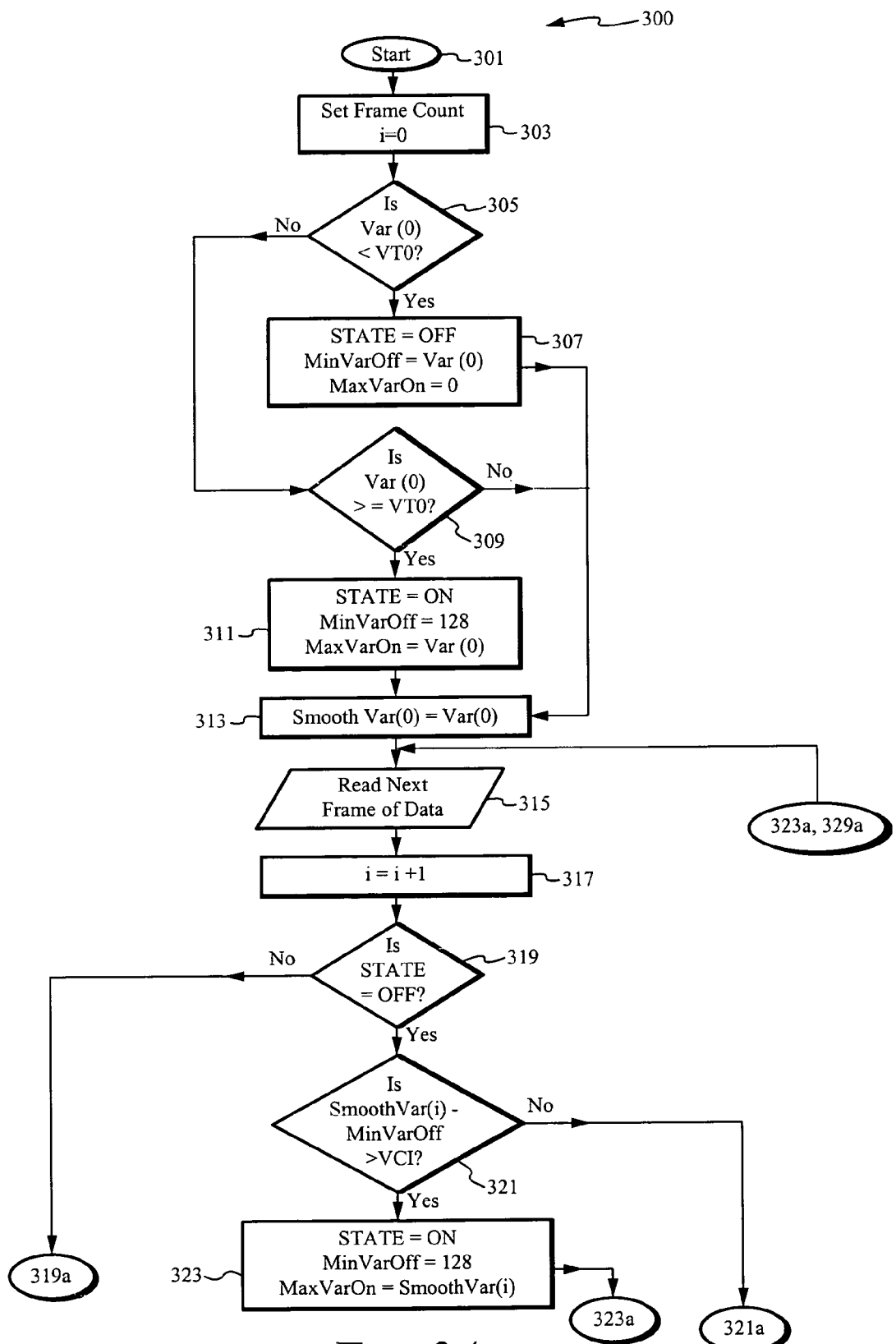
FIG. 3 is a flow chart illustrating the steps for determining whether a finger is on a sensor in accordance with the present invention.
Figure 3B:
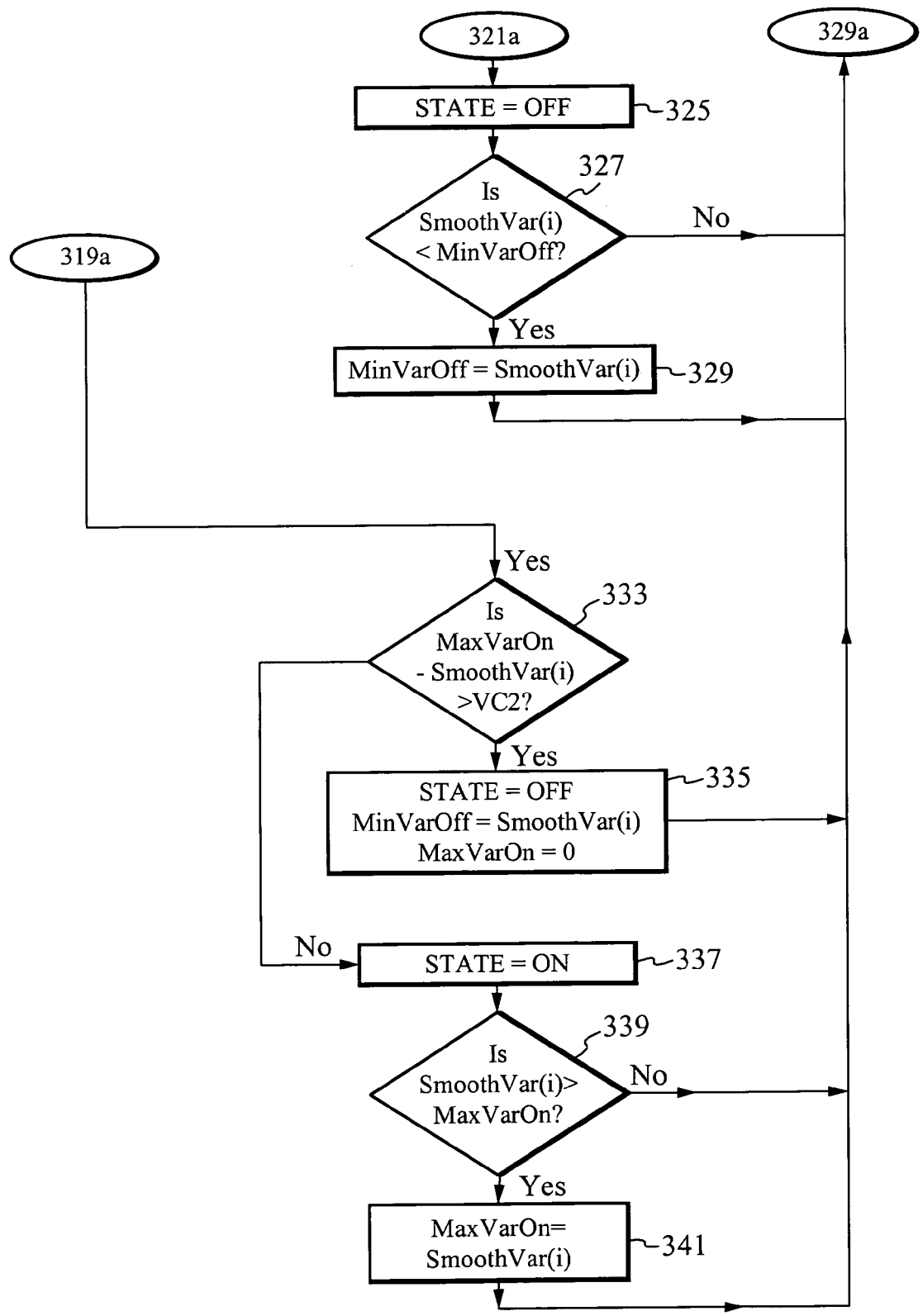

FIG. 3 shows the steps 300 of the method of the preferred embodiment, used to determine whether a finger is on the swipe sensor 101 of FIG. 1. This determination is made using steps performed on the Finger Presence Detector 115 of FIG. 1. As explained in more detail below, the steps 300 use the history of a variance of the images on the swipe sensor 101 to determine whether a finger is on the swipe sensor 101.

The start step 301 proceeds to the step 303, in which the frame count i is initialized to 0. Next, in the step 305, it is determined whether the variance at time t=0, Var(0), is less than a threshold VT0, described below. If Var(0) is less than VT0, processing continues to the step 307; otherwise, processing continues to the step 309. In the step 307, the variable STATE is set to OFF, the variable MinVarOff is set to Var(0), the variable MaxVarOn is set to 0, and processing continues to the step 313. In the step 309, it is determined whether Var(0) is greater than or equal to VT0. If Var(0) is greater than or equal to VT0, then processing continues to the step 311; otherwise, processing continues to the step 313. In the step 311, the variable STATE is set to ON, the variable MinVarOff is set to 128, the variable MaxVarOn is set to Var(0), and processing continues to the step 313, in which the variable SmoothVar(0) is set to Var(0).

Next, in the step 315, the next frame of image data is read from the swipe sensor 101 of FIG. 1, and in the step 317, the frame counter i is incremented. In the step 319, it is determined whether the STATE is OFF. If the STATE is OFF, processing continues to the step 321; otherwise, processing continues to the step 333. In the step 321, SmoothVar(i)–MinVarOff is compared to VC1. Processing continues to the step 323 if SmoothVar(i)–MinVarOff is greater, and continues to the step 325 if not. In the step 323, the variable STATE is set to ON, the variable MinVarOff is set to 128, the variable MaxVarOn is set to SmoothVar(i), and processing loops back to the step 315.

In the step 325, the variable STATE is set to OFF. Next, in the step 327, SmoothVar(i) is compared to MinVarOff. If SmoothVar(i) is less than MinVarOff, processing proceeds to the step 329; otherwise, processing proceeds to the step 315. In the step 329, the variable MinVarOff is set to SmoothVar(i), and processing loops back to the step 315.

In the step 333 (reached because the STATE equals ON), the value of MaxVarOn–SmoothVar(i) is compared to value of VC2, which is described below. If MaxVarOn–SmoothVar (i) is greater than VC2, then processing proceeds to the step 335; otherwise, processing continues at the step 337. In the step 335, the variable STATE is set to OFF, the variable MinVarOff is set to SmoothVar(i), the variable MaxVarOn is set to 0, and processing loops back to the step 315. In the step 337, the variable STATE is set to ON. Next, in the step 339, the variable SmoothVar(i) is compared to MaxVarOn. If SmoothVar(i) is greater than MaxVarOn, processing continues to the step 341; otherwise, processing loops back to the step 315. In the step 341, the variable MaxVarOn is set to SmoothVar(i), and processing loops back to the step 315.

It will be appreciated that in the steps above that loop back to the step 315, this loop back can be aborted by other means.

The steps 300 track the peak of the SmoothVar when the finger is thought to be on the swipe sensor 101, and tracks the minimal valley when the finger is thought to be off the swipe sensor 101. SmoothVar(t) is a function of time t. The STATE changes only when there is appreciable difference between the current SmoothVar(t) and the last peak or valley. When STATE is ON, the system 100 determines that a finger is detected; otherwise, when STATE is OFF, the system 100 determines that no finger is detected.

Embodiments of the present invention advantageously smooth out noise and also use context to make decisions, rather than using instantaneous values to make those decisions. In addition, because embodiments of the invention use variance changes rather than absolute variance, the algorithm used by the embodiments is more robust in different environmental conditions and with different sensor types.

Still referring to FIG. 3, VT0 can range from 1-80 typically, depending on the sensor, but the preferred embodiment uses 35. VC1 and VC2 can range between 1 and 50, with the optimal values again being somewhat sensor dependent. In the preferred embodiment, VC1=VC2=8. It will be appreciated, however, that VC1 and VC2 can take on any combination of values. Because finger movement can cause natural fluctuations in the SmoothVar(i), too small a value for VC1 and VC2 would cause needless state changes and can therefore cause incorrect detection of finger presence at any given time. In alternative embodiments, VC1 and VC2 can be percentages of the peaks and valleys (e.g. VC1=20% of MinVarOff, VC2=25% of MaxVarOn), or more complex linear or non-linear functions of the peaks and valleys.

Figure 4A:
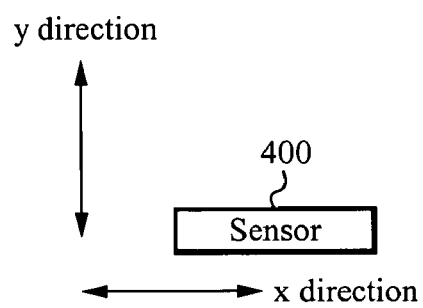
FIGS. 4A and 4B show two orientations for a fingerprint image sensor in accordance with the present invention.
Figure 4B:
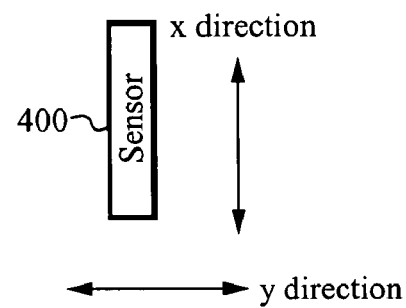

Again referring to FIG. 1, the Linear Movement Correlator 113 generates on its output ports finger movement ΔX 133 and ΔY 134 in two orthogonal directions, where ΔX is the x-dimension movement along the width of the sensor and ΔY is the y-dimension movement along the height of the sensor, as defined in FIGS. 4A and 4B. FIG. 4A shows a first orientation of a swipe sensor 400, with an abbreviated length in the y-direction, in accordance with one embodiment of the present invention. FIG. 4B shows a second orientation of the swipe sensor 400, with an abbreviated length in the x-direction, in accordance with another embodiment of the present invention. It will be appreciated that generally a user will swipe her finger in the y-direction (e.g., vertically) when using the swipe sensor 400 oriented in the manner shown in FIG. 4A and in the x-direction (e.g., horizontally) when using the swipe sensor 400 oriented in the manner shown in FIG. 4B. The row-based correlation algorithm that detects ΔY 134 in terms of rows and ΔX 133 in terms of pixels is illustrated in U.S. patent application Ser. No. 10/194,994, filed Jul. 12, 2002, and titled "Method and System for Biometric Image Assembly from Multiple Partial Biometric Frame Scans,"

which is also incorporated by reference in its entirety. The finger displacement is calculated without first calculating the speed of movement. An additional benefit of the row-based algorithm is that it detects movement between successive rows with only one or two ridges, without relying on pores.

In accordance with the present invention, the Rotational Movement Correlator 112 is implemented without mechanical parts. The Rotational Movement Correlator 112 produces an estimate of rotational movement ΔΘ132 of a finger. In the preferred embodiment, each frame of the finger image is divided into two (left and right) windows. Successive frames of the same window are analyzed for rotation. Using the Linear Movement Correlator 113 in each window, the row offset in the Y dimension of each window is calculated. If the row offset indicates that the image in the left window is going in an opposite direction from the image in the right window, then a rotation is detected. For example, if the left window shows the image is going up while the right window shows the image is going down, then the finger is rotating in the clockwise direction.

Rotational movement ΔΘ132 can be expressed in terms of an angle of rotation, which is computed as the sum of the row offsets of the two windows, divided by a normalization factor. The result is the angle of movement in radians.

The significance of this algorithm is its simplicity. Computed correlation values from each window can be combined to provide the correlation values of the entire frame. Hence little additional computing resource is needed and latency is not an issue. With this level of simplicity, the Rotation Movement Correlator 112 can be easily implemented in hardware, especially if a linear movement correlator has been implemented already.

It will be appreciated that the number of windows can be expanded to improve granularity of angle movement and capture finger rotation even if the finger is not exactly at the center of the sensor 101. It will also be appreciated that the sizes of each window do not have to be the same, and that no overall symmetry in their placement is required.

Embodiments of the present invention advantageously measure finger pressure by combining statistics of a frame and the area of finger detection, without using a pressure transducer and without detecting ridge width or counting pixels.

The value, or gray level, of a pixel in a frame darkens as greater downward finger pressure is applied to the frame, and lightens as the pressure decreases. In the preferred embodiment, a pixel is defined to have 15 gray levels, with level 0 corresponding to no finger present and level 14 corresponding to a finger whose presence fully darkens the pixel. Alternatively, a pixel has 16 gray levels (4 binary digits) numbered 0 through 15. It will be appreciated that in accordance with the present invention, a pixel can have any number of gray levels defined by any number of binary digits. The frame average and frame variance is described in U.S. patent application Ser. No. 10/194,994, incorporated by reference above. This effect also directly results in variance fluctuations as well.

Detecting ridge width requires intensive computation to determine the extent of a ridge and to follow its contours so that its width can be measured. Pixel counts are often highly variable, and require applying a threshold—either fixed or based on the median—to determine which pixels are a part of the background and which are from the finger itself.

Embodiments of the present invention determine relative finger pressure by combining smoothed frame statistics with information about which parts of the sensor within a given region detect a finger to give a range of pressure estimates.

Figure 5:
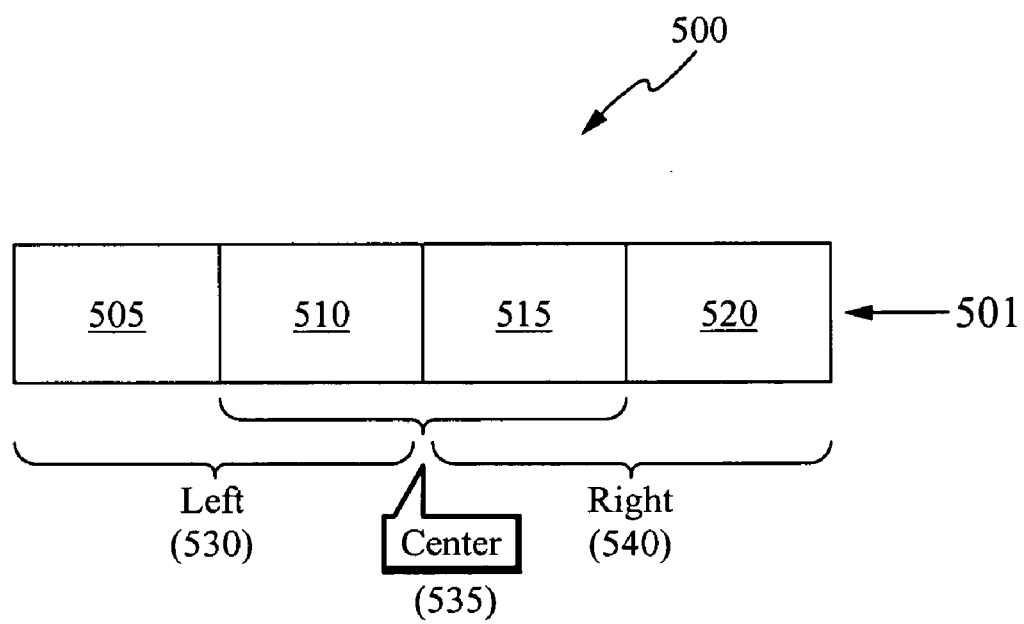
FIG. 5 shows a fingerprint image sensor subdivided into three overlapping sections in accordance with the present invention.

FIG. 5 illustrates a preferred embodiment of a finger sensor 500 in accordance with the present invention. The sensor finger sensor 500 comprises a frame 501. The frame 501 is logically divided into four regions (sub-frames) 505, 510, 515, and 520 that are processed as three separate but overlapping regions: a left sub-frame 530 (the combination of the regions 505 and 510), a center sub-frame 535 (the combination of the regions 510 and 515), and a right sub-frame 540 (the combination of the regions 515 and 520). It will be appreciated that in accordance with the present invention the sensor 500 can be divided into any number of overlapping regions, contiguous regions, or any combination of overlapping and contiguous regions.

Finger detection as described in Finger Presence Detector 115 is run on the left, right and center sub-frames separately, and conclusions about finger presence in each region are determined independently. The variables ΔLeft (the difference between the left sub-frame 530 at different iterations), ΔCenter (the difference between the center sub-frame 535 at different iterations), and ΔRight (the difference between the right sub-frame 540 at different iterations) are defined as zero if a finger is not detected, and one if a finger is detected, in the left sub-frame 530, the center sub-frame 535, and the right sub-frame 540 respectively.

As mentioned above, the mean (average) and variance calculations tend to fluctuate a significant amount due to noise. They are exponentially smoothed by Equation 2 and Equation 3 below:

$$\text{SmoothAvg}(i) = fac * \text{SmoothAvg}(i-1) + (1-fac) * \text{Avg}(i) \quad \text{[Equation 2]}$$

$$\text{SmoothVar}(i) = fac * \text{SmoothVar}(i-1) + (1-fac) * \text{Var}(i) \quad \text{[Equation 3]}$$

In alternative embodiments, the smoothed statistics could be used for a given sub-frame of the sensor instead of for the entire array.

Figure 6:
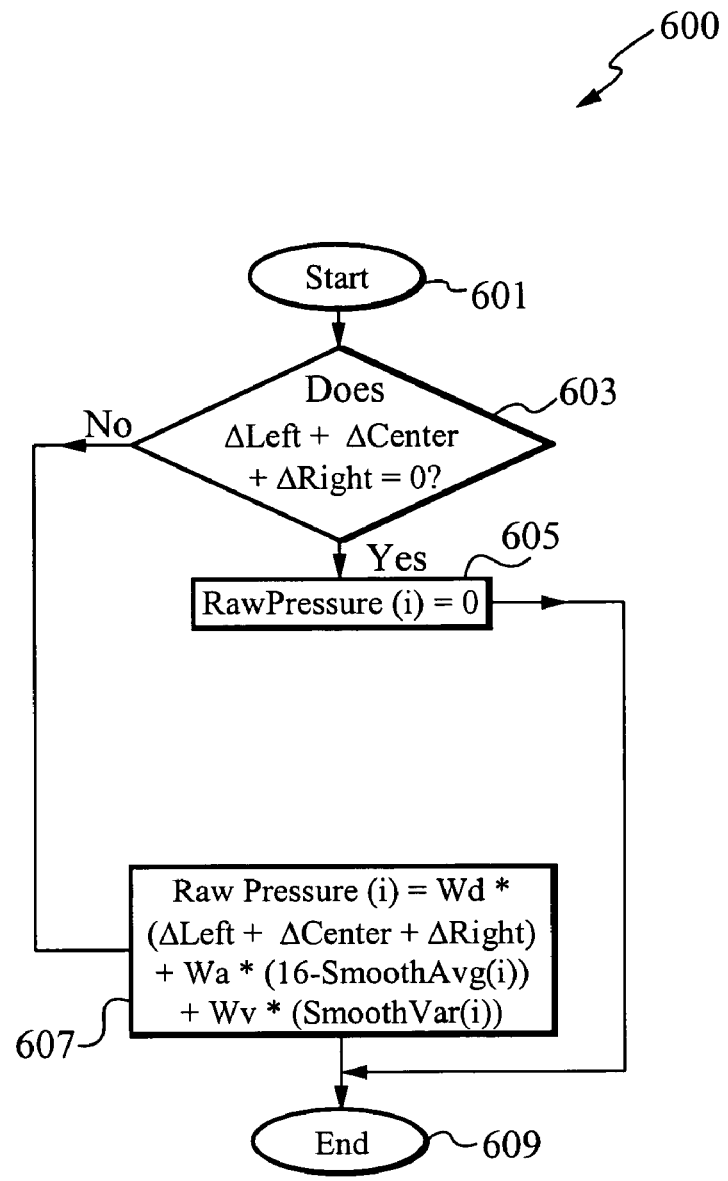
FIG. 6 is a flow chart illustrating the steps for determining the pressure exerted on a finger image sensor in accordance with the present invention.

FIG. 6 illustrates the steps 600 used to calculate the estimated pressure at frame i in accordance with one embodiment of the present invention. The steps are performed in the Pressure Sensitive Button 126 shown in FIG. 1. Referring to FIG. 6, the process starts in the step 601 and continues to the step 603, in which the sum ΔLeft+ΔCenter +ΔRight is compared to 0. If the two are equal, processing continues to the step 605; otherwise, processing continues to the step 607. In the step 605, the variable RawPressure(i) is set to 0, and processing proceeds to the step 609, where it ends. Here, i equals the current frame count. In the step 607, the variable RawPressure(i) is set to the value Wd*(ΔLeft+ΔCenter+ΔRight)+Wa*(16−SmoothAvg(i))+Wv*(SmoothVar(i)), where Wd, Wa and Wv are weighting factors, each greater than or equal to zero. Preferably, Wd=3, Wa=0.25, and Wv=0.05. Alternate embodiments can use different weightings. It is also possible to use non-linear functions to calculate RawPressure(i) when a finger is present, and to use the separate left, right and center statistics as well.

For more reliability, the preferred embodiment smoothes the RawPressure estimates exponentially, using the following Equation (4):

$$\text{SmoothPressure}(i) = facP * \text{SmoothPressure}(i-1) + (1-facP) * \text{RawPressure}(i) \quad \text{[Equation 4]}$$

where facP has any value between 0 and 1. Preferably, facP=0.9. In alternative embodiments, the RawPressure estimates are not smoothed.

Referring to FIG. 1, by calculating the pressure estimates as described above, the Pressure Detector 114 generates the Pressure Info 135 over a wide range of applied pressures. In general, if the Finger Presence Detector 114 detects no finger, the pressure is defined as zero. The more regions the finger is detected in, the higher the pressure applied. Darker average and larger variance mean more pressure is applied. Similar to other instruments, the Pressure Detector 114 may be partially or fully implemented in hardware integrated with the swipe sensor 101.

The Time Interval Accumulator 111 is an optional instrument that, if available, will be implemented in hardware integrated with the swipe sensor 101. The Time Interval Accumulator 111 has an Event Buffer 170 (not shown) and is capable of recording timestamps. Timestamp data are important because most non-realtime computing platforms cannot always read data from the swipe sensor 101 the instant it becomes available. This is usually because the host operating system is busy processing interrupts, which may last 25 milliseconds or more. As long as the data from the swipe sensor 101 is timestamped, the host computing platform will have realtime information on when the events it receives actually happened, relative to one another. This information can help games to be more responsive and improve the overall user experience. Furthermore, accurate frame timestamps also allow the optimal use of computational resources by allowing precise control of the frame measurement rate.

When emulating user input devices, the real time performance is important to provide timely feedback to the user. To improve system performance, Cheng in U.S. patent application Ser. No. 10/099,558, filed Mar. 13, 2002, titled "Fingerprint Biometric Capture Device and Method With Integrated On-Chip Data Buffering," hereby incorporated by reference in its entirety, has disclosed a structure using on-chip memory, which temporarily stores frames of image data before the data are transmitted to the host system. The internal memory, an Event Buffer 171 (not shown), is particularly helpful to store the data if the computing platform 120 is temporarily unavailable because of interrupts or other I/O events. The Event Buffer 171 couples the group of instruments 110 and the host computing platform 120 and is configured to store multiple types of data including but not limited to image frame data, rotational deltas, x and y deltas, clicks and double clicks, pressure changes, and finger presence information.

It will be appreciated that in accordance with the present invention, an Event Buffer 170 can be used to store raw data that is later processed. The Event Buffer 170 preferably forms part of the Time Interval Accumulator 111. Alternatively, or additionally, an Event Buffer 171 can be used to store processed data such as rotational data such as rotational movement $\Delta\Theta$ (132, FIG. 1), or linear movement $\Delta X$ and $\Delta Y$ (133 and 134, FIG. 1), or Pressure Info (135, FIG. 1), or Finger Presence Info (136, FIG. 1). It will be appreciated that event buffers can be used to store other information in accordance with the present invention, and thus can be coupled to the components in various ways.

In most traditional applications such as authentication for finger image sensors, an accurate measurement of time intervals between fingerprint images or frames emitted by the swipe sensor 101 is not required. Typically, the time interval, if required, is estimated in software on the computing platform 120 by measuring the frame rate over a number of frames, as the frame rate depends on process load and is not a predetermined value. However, for user input applications, time information associated with finger image data is essential to provide desirable feedback to users. For example, time information is needed to estimate velocities and accelerations of finger movements so that a mouse pointer can show the corresponding movements. One aspect of the invention is to have the sensor calculate and record a timestamp for a frame, or calculate and record the time interval between certain frames or a certain navigation event. For example, an internal counter with millisecond resolution will generate time values to associate with every frame. It is the time interval or relative time value, not the absolute time value, which is important for user input purposes.

The time information, when combined with movement values from other instruments of the invention, allows the host processor to more accurately compute velocities and accelerations of finger movements. Furthermore, the capability to record time information with finger image data enables the swipe sensor 101 to better operate asynchronously from its I/O interaction with the computing platform 120, and decouples the real time performance and responsiveness of the controller from the variable and unpredictable latencies of the hardware and software architecture of the host device coupled to or forming part of the computing platform 120. For example, the computing platform 120 may be a mobile phone receiving wireless signals for incoming calls, which may divert the computing power of its processor for a short interval and delay responding to the swipe sensor 101.

Embodiments of the present invention advantageously implement a subset of the entire group of instruments 110 in hardware integrated with the finger image sensor to become the sensor logic 114, which performs some processing of finger images. The processing will extract a subset of information sufficient to indicate the user input, according to the current operating mode. For example, if the system is set to emulate a steering wheel, then instead of transmitting multiple frames of raw image data 131, the sensor logic 104 computes and transmits only the rotational movement $\Delta\Theta$ 132, such as angle changes exceeding a certain threshold, to the computing platform 120. The process involves performing computations using the Rotational Movement Correlator 112, and buffering the resulting calculated change of the rotation angle in a Rotation Event Buffer (not shown) coupled to the Rotational Movement Correlator 112. The resulted rotational movement $\Delta\Theta$ 132 requires less memory than does the raw finger image 131. If the host is not able to read the rotational data before the next rotational angle change is calculated, the new calculation is also stored in the Rotation Event Buffer. When the host is ready to read data, it can read all of the stored data from the Rotation Event Buffer at once. Because the sensor logic 114 extracts and transmits only the data required by the computing platform 120, embodiments of the present invention thus advantageously require less memory, Input/Output capacity and computational resources of the computing platform 120. While this innovation of hardware implementation is desirable, it is not a necessary feature for a user input device.

The Mouse Emulator unit 121 is able to emulate two-dimensional movements of a mouse pointer, as well as clicks and double clicks. The movements $\Delta X$ 133 and $\Delta Y$ 134 generated by the Linear Movement Correlator 113, are scaled non-linearly in multiple stages to map to the pointer movements on a display. In the preferred embodiment, three stages are required: smoothing, scaling and filtering.

For every iteration, the remainder of the previous x-dimension movement is added to $\Delta X$ 133. The result of the addition is divided by a smoothing factor SmoothingScale. The integer quotient of the division is the smoothed finger movement is called fingerMovementX. The remainder of the division is carried forward to the next iteration. The steps are exactly the same in the y-dimension. Hence, the remainder of the previous y-dimension movement is added to $\Delta Y$ 134. The result of the addition is divided by a smoothing factor SmoothingScale. The integer quotient of the division is the smoothed finger movement called fingerMovementY. The remainder of the division is carried forward to the next iteration.

Figure 7:
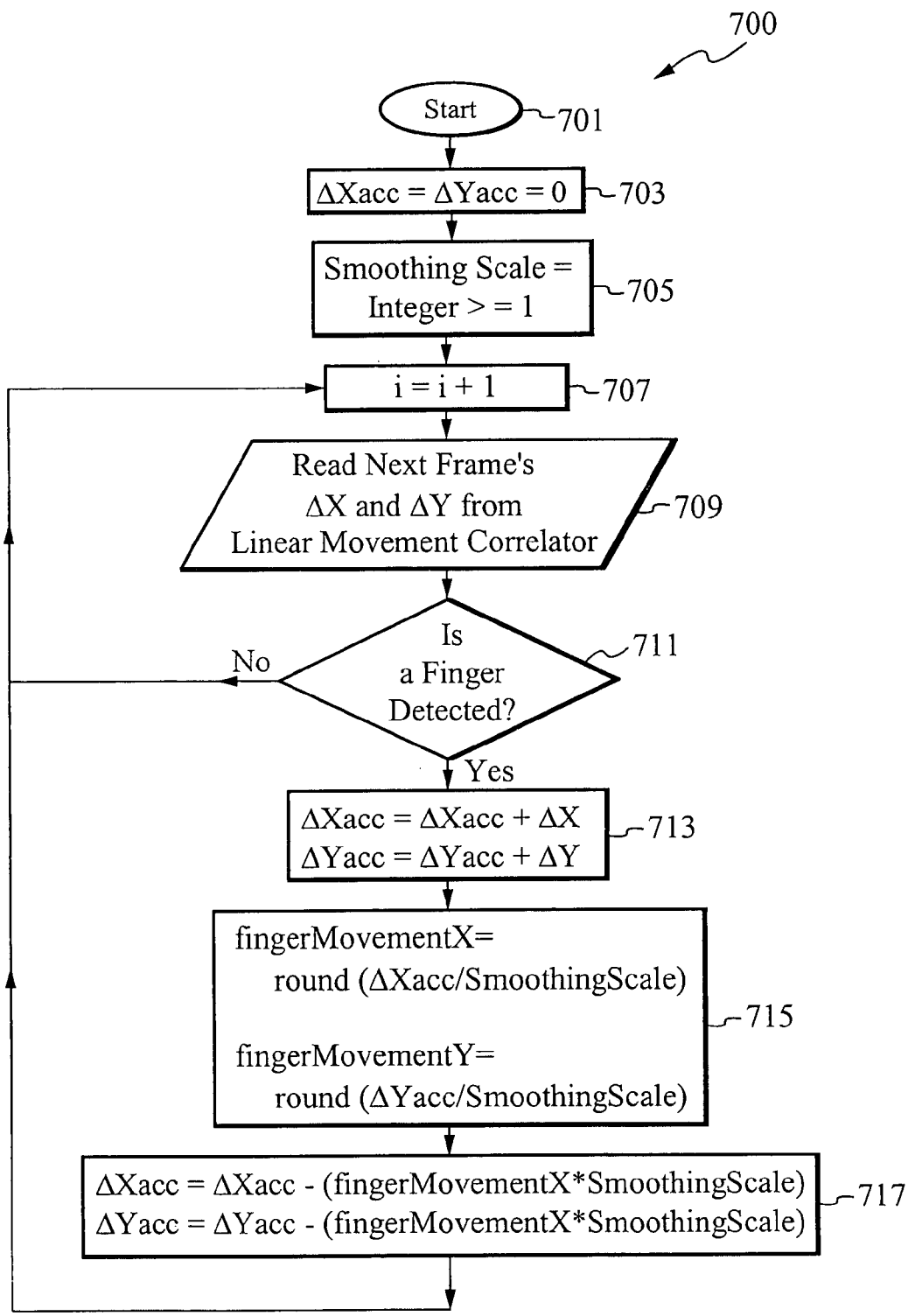
FIG. 7 is a flow chart illustrating the steps for smoothing finger movements for emulating a mouse in accordance with the present invention.

FIG. 7 illustrates the steps 700 used to implement the smoothing stage. After the start step 701, the accumulators ΔX and ΔY are both set to 0 in the step 703. Next, in the step 705, the variable SmoothingScale is set to a predetermined integer greater than or equal to 1. In other embodiments, SmoothScale is set to a floating point value without loss of generality. Next, in the step 707, the iteration counter i is incremented. In the step 709, the ΔX and ΔY of the next frame are both read from the Linear Movement Correlator 113 and processing continues to the step 711. In the step 711, it is determined whether a finger has been detected on the swipe sensor 101 of FIG. 1. This determination is made at the Finger Presence Detector 115 (FIG. 1). If a finger has been detected, processing continues to the step 713; otherwise, processing loops back to the step 707.

In the step 713, the variable ΔXacc is set to ΔXacc +ΔX, and the variable ΔYacc is set to ΔYacc+ΔY. Next, in the step 715 the variable fingerMovementX is set to ΔXacc/SmoothingScale, rounded to the nearest integer, and the variable fingerMovementY is set to ΔYacc/SmoothingScale, also rounded to the nearest integer. Next, in the step 717, the variable ΔXacc is set to ΔXacc—(fingerMovementX*SmoothingScale) and the variable ΔYacc is set to ΔYacc—(fingerMovementY*SmoothingScale). In the step 717, the remainders of both operations are kept. Next, processing loops back to the step 707.

In the steps 700, "SmoothingScale" serves to smooth the movement. Therefore, fingerMoveX and fingerMoveY are non-linearly smoothed versions of the raw finger movements. Note that SmoothingScale does affect actual movement on a display.

Proper mouse emulation requires implementing a motion model to allow both macro-motion and micro-motion with the same device, depending on user behavior. For instance, when a user wishes to move from one side of the screen to the other, he wants to do that with minimal effort, without lifting his finger multiple times. This requires that the screen motion in pixels be much larger than the actual motion of the finger on the device (accelerated mode). However, frequently, the user will also need to make precise movements on the screen, and therefore a smaller scaling factor is required (decelerated mode). The scaling factor at iteration i is denoted as ScreenScale(i). ScreenScale(i) is not a fixed value; instead, it is a function of user behavior at any given time.

At any iteration i, the movement equations are defined for the pointer on the display by Equations 5 and 6:

$$\text{ScreenMovement}X(i) = \text{ScreenScale}(i) * \text{fingerMovement}X(i) \quad [\text{Equation 5}]$$

$$\text{ScreenMovement}Y(i) = \text{ScreenScale}(i) * \text{fingerMovement}Y(i) \quad [\text{Equation 6}]$$

Equations 5 and 6 use acceleration and deceleration in a piecewise-linear fashion. During operation, the algorithm of FIG. 7 records both the amount of finger movement that has occurred for the last N movements, and the frame number for each event, saved in a history buffer (not shown). Preferably, N equals 32 but can be any value between 1 and 1000.

Each time a movement event occurs, the last N movements in both the x and y directions are summed, denoted by Sum(x) and Sum(y) respectively. Here, a movement event is any user action that results in emulating a movement such as turning a steering wheel, pressing a mouse button, or moving a cursor, a joystick, a navigation bar, or a scroll wheel. If either Sum(x) or Sum(y) or Sum(x)+Sum(y) is greater than a predetermined threshold TA, then the scaling factor ScreenScale(i) is set to a high value to allow fast screen movement. If, on the other hand, the amount of movement is less than a second threshold TD, the scaling factor ScreenScale(i) is set to a low value. If neither is the case, then ScreenScale(i) is set to a default (normal mode) value. ScreenScale(i) can range from a near-zero value to a very large value, and preferably is configurable. In the preferred embodiment, ScreenScale(i) for accelerated mode equals 4; ScreenScale(i) for decelerated mode equals 1; and ScreenScale(i) in default mode equals 2.

A very minor shaking of a finger on a swipe sensor (e.g., swipe sensor 101, FIG. 1) will translate into rapid fluctuations of a mouse pointer, causing a fuzzy appearance of the pointer. In another embodiment, non-linear filtering, such as exponential filtering, is used for more natural screen movement. In this embodiment, movement in a given direction is smoothed according to Equation 7:

$$\text{ScreenMovement}X(i) = \text{ExponentialFilter} * [\text{Screen-Scale}(i-1) * \text{fingerMovement}X(i-1)] + (1 - \text{ExponentialFilter}) * [\text{ScreenScale}(i) * \text{fingerMovement}X(i)]$$

where $0.0 <= \text{ExponentialFilter} <= 1.0$ [Equation 7]

A larger value of ExponentialFilter results in more smoothing but also more lag or delay from finger movement to display motion. In the preferred embodiment, ExponentialFilter equals 0.2. Exponential filtering is a non-linear operation.

In another embodiment, median filtering is added in all modes to smooth the results and make the screen motion more natural. Median filtering is well known in the art. In this embodiment, a window of 5 consecutive movements is used. The center point is replaced with the median of all 5 points. This prevents spurious movements that might occur due to sensor noise. Median filtering is a non-linear operation.

Mouse clicks are integral parts of mouse operations. In the preferred embodiment, the sequence of finger-up-to-down (FD) and finger-down-to-up (FU) transitions along with finger movement signifies a Single Click (e.g., an event). A single click begins with a finger-up-to-down transition (FD_1) followed by a finger-down-to-up transition (FU_1) without movement while the finger is down. The finger must remain down without movement for a predetermined threshold of time Td. There is no limit to how long the finger can remain on a swipe sensor without movement to be considered a single click. After FU_1, the finger must not be in contact with the sensor for a minimum duration of T1 to avoid confusion with a double-click.

Scroll wheels, controlling cursors, or pointing indicators in one dimension are typically found in PDAs. The emulation of a scroll wheel is very similar to that of a mouse pointer, except that the value of either ΔX 133 or ΔY 134, but not both, is used. The other direction will be ignored, or treated as zero. In addition, the Scroll Wheel Emulator unit 121 can also provide a clicking mechanism to indicate selection. The emulation of selecting in a scroll wheel is the same emulation for that of a single click in a mouse.

Figure 8:
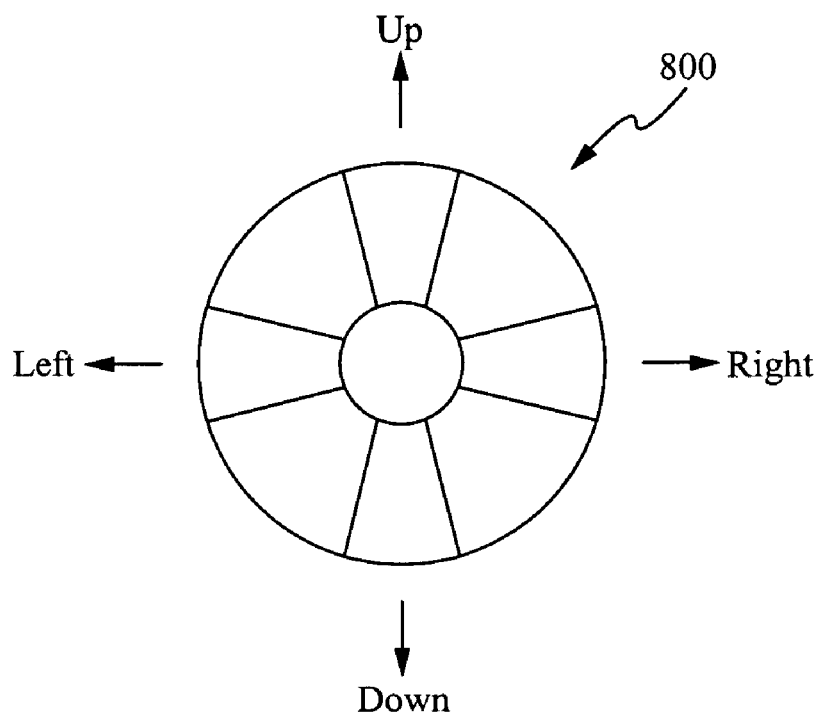
FIG. 8 shows a 4-way navigation bar in accordance with the present invention.

FIG. 8 illustrates one embodiment of a navigation bar 800, a 4-way button, or 4-button cluster, representing, for example, up, down, left, and right functions as found on game controllers or PDAs. Some of these buttons or button clusters support combinations of buttons for additional directions such as up and left, up and right, down and right, and down and left to allow 8-way navigation. Some navigation bars also support an additional function for selection, such as pressing on the center of a navigation button.

To emulate a navigation bar or button cluster, X and Y motions are accumulated as with the mouse pointer emulation described above. The X and Y space is then divided into four or eight (or some other number, such as twelve) sectors. The number of sectors is the number of controllable directions. The Linear Movement Correlator 113 generates ΔX 133 and ΔY 134, which both consist of the direction and the distance of movement. Whenever enough motion exceeding a defined threshold has been detected, a navigation event is emitted to indicate a unit of motion in the direction corresponding to the sector. In other words, finger movement is translated into quantum steps of movement through navigation bar emulation.

Figure 9A:
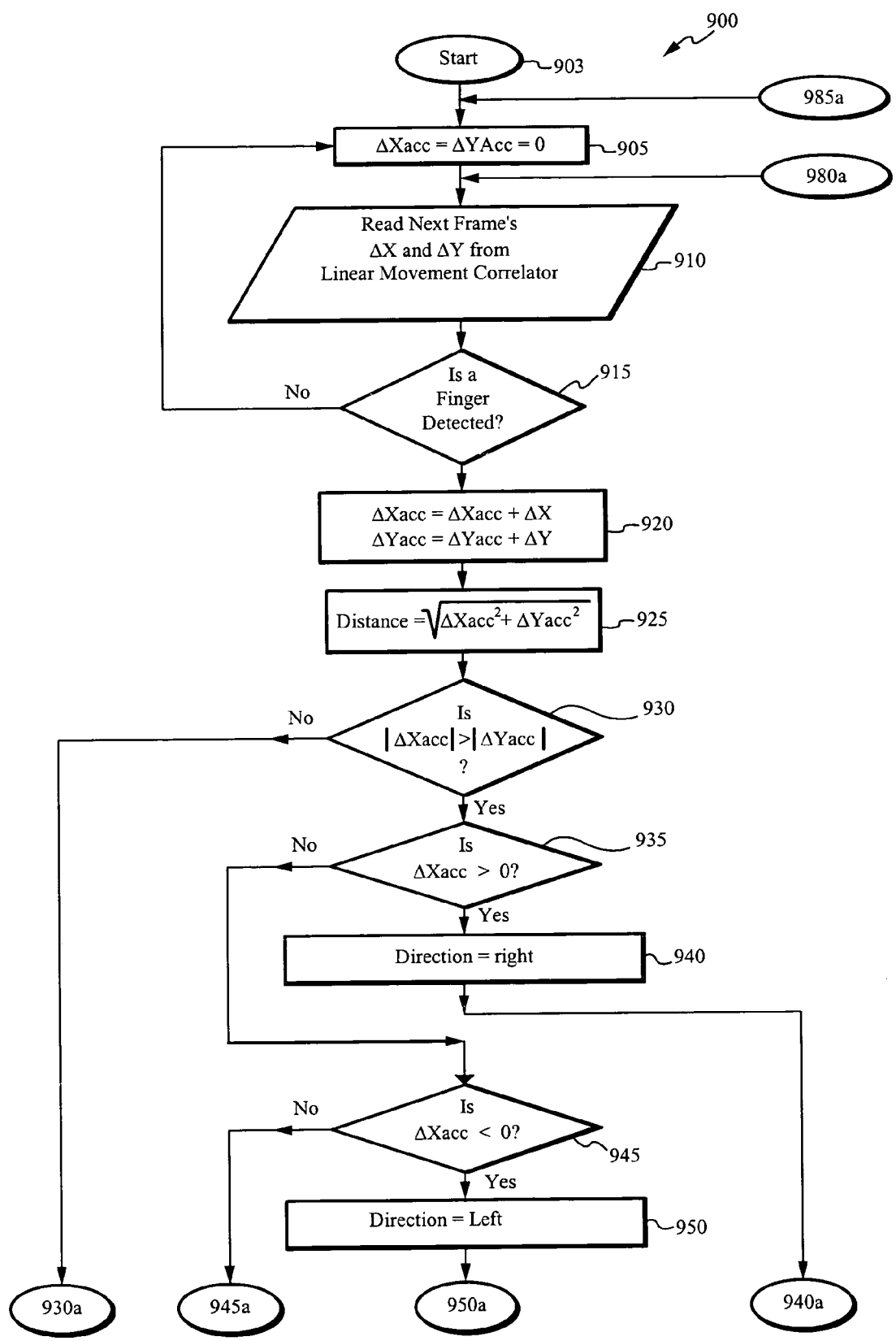
FIG. 9 is a flow chart illustrating the steps for determining the movement and direction for emulating a 4-way navigation bar in accordance with the present invention.
Figure 9B:
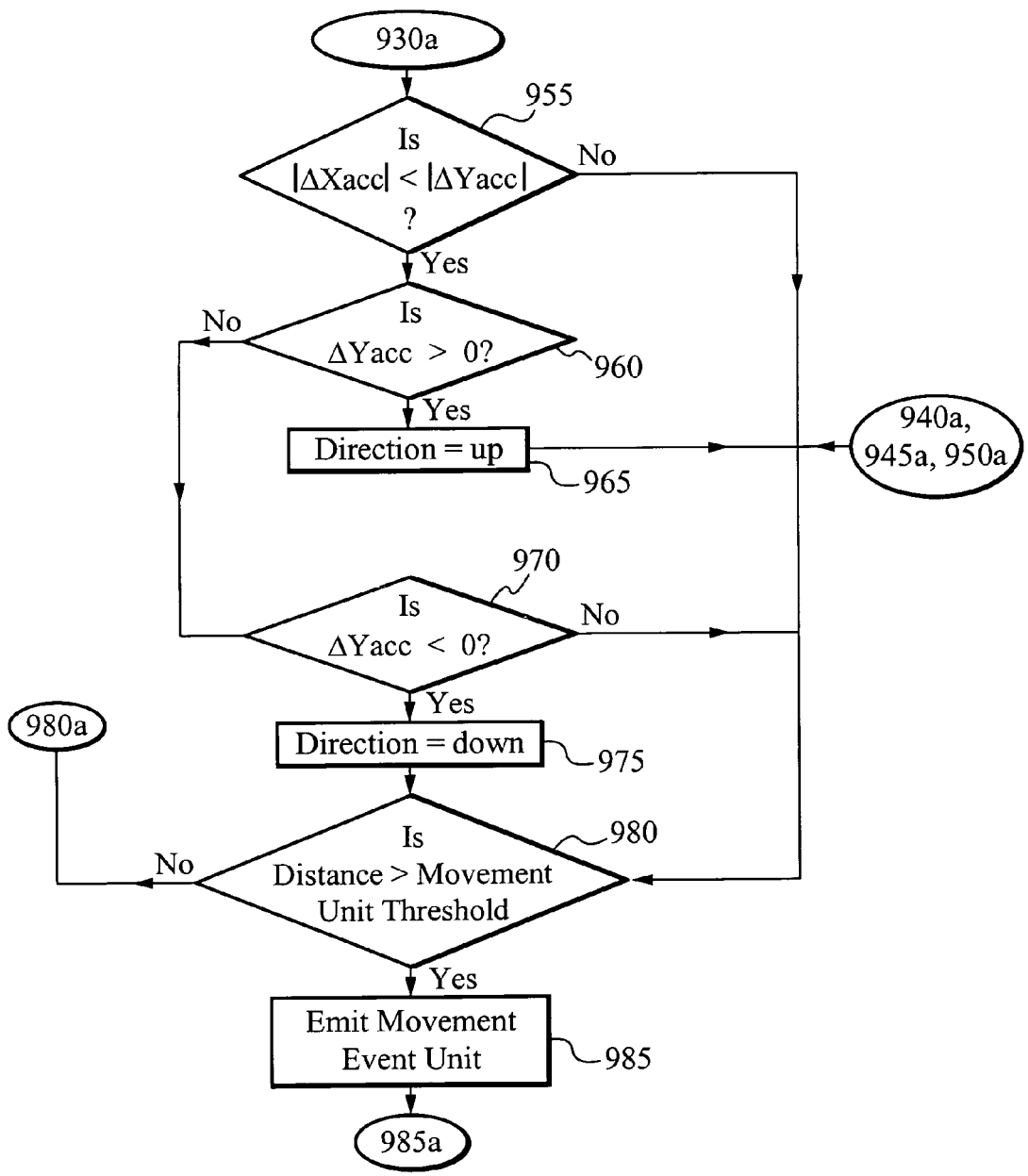

FIG. 9 illustrates the steps 900 for emulating a 4-way (4-sector) navigation bar in accordance with the present invention. These steps are performed by the Navigation Bar Emulator unit 124. After the start step 901, the accumulators ΔXacc and ΔYacc are both set to 0. Next, in the step 910, the next frame's ΔX and ΔY are received from the Linear Movement Correlator 113. Next, in the step 915, it is determined whether a finger is detected on the swipe sensor 101. If a finger has not been detected, processing loops back to the step 905. Otherwise, processing continues to the step 920, in which the variable ΔXacc is set to ΔXacc+ΔX, and the variable ΔYacc is set to ΔYacc+ΔY. Next, in the step 925, the variable distance is set to $(\Delta Xacc^2 + \Delta Yacc^2)^{1/2}$. Next, in the step 930, the absolute value of ΔXacc is compared to the absolute value of ΔYacc. If the absolute value of ΔXacc is larger than the absolute value of ΔYacc, processing continues to the step 935; otherwise, processing continues to the step 955.

In the step 935, ΔXacc is compared to 0. If ΔXacc is larger than 0, processing continues to the step 940; otherwise, processing continues to the step 945. In the step 940, the variable direction is set to RIGHT, and processing continues to the step 980. In the step 945, the variable ΔXacc is compared to 0. If ΔXacc is less than zero, processing continues to the step 950; otherwise, processing continues to the step 980. In the step 950, the variable direction is set to LEFT and processing continues to the step 980.

In the step 955, the absolute value of ΔXacc is compared to the absolute value of ΔYacc. If the absolute value of ΔXacc is less than the absolute value of ΔYacc, processing continues to the step 960; otherwise, processing continues to the step 980. In the step 960, the variable ΔYacc is compared to 0. If ΔYacc is greater than 0, processing continues to the step 965; otherwise, processing continues to the step 970. In the step 965, the variable direction is set to UP, and processing continues to the step 980.

In the step 970, the variable ΔYacc is compared to 0. If ΔYacc is less than 0, processing continues to the step 975; otherwise, processing continues to the step 980. In the step 975, the variable direction is set to DOWN, and processing continues to the step 980. In the step 980, the variable Distance is compared to a predetermined movement unit threshold, such as the value 10. It will be appreciated that floating point values can also be used. If distance is greater than the movement unit threshold, processing continues to the step 985; otherwise, processing continues to the step 910. In the step 985, a movement event with the direction determined in one of the steps 940, 950, 965, or 975 is emitted from the computing platform 120, and processing loops back to the step 905.

While considering the steps 900 it will be appreciated that the steps 900 can be generalized to emulate navigation bars of any number of directions.

One embodiment of the present invention emulates a 2-axis analog or proportional digital joystick as found on a game controller. A physical joystick produces X and Y movements, and has an automatic centering mechanism provided by a spring or spring/damper combination and/or force feedback provided by a motor or other actuator such that it returns to a home position when released by the user.

To emulate a joystick, the movements ΔX 133 and ΔY 134, generated by the Linear Movement Correlator 113, is scaled non-linearly to map to the joystick movements. The joystick returns to a home position when the finger is removed from the finger swipe sensor 101.

Figure 10A:
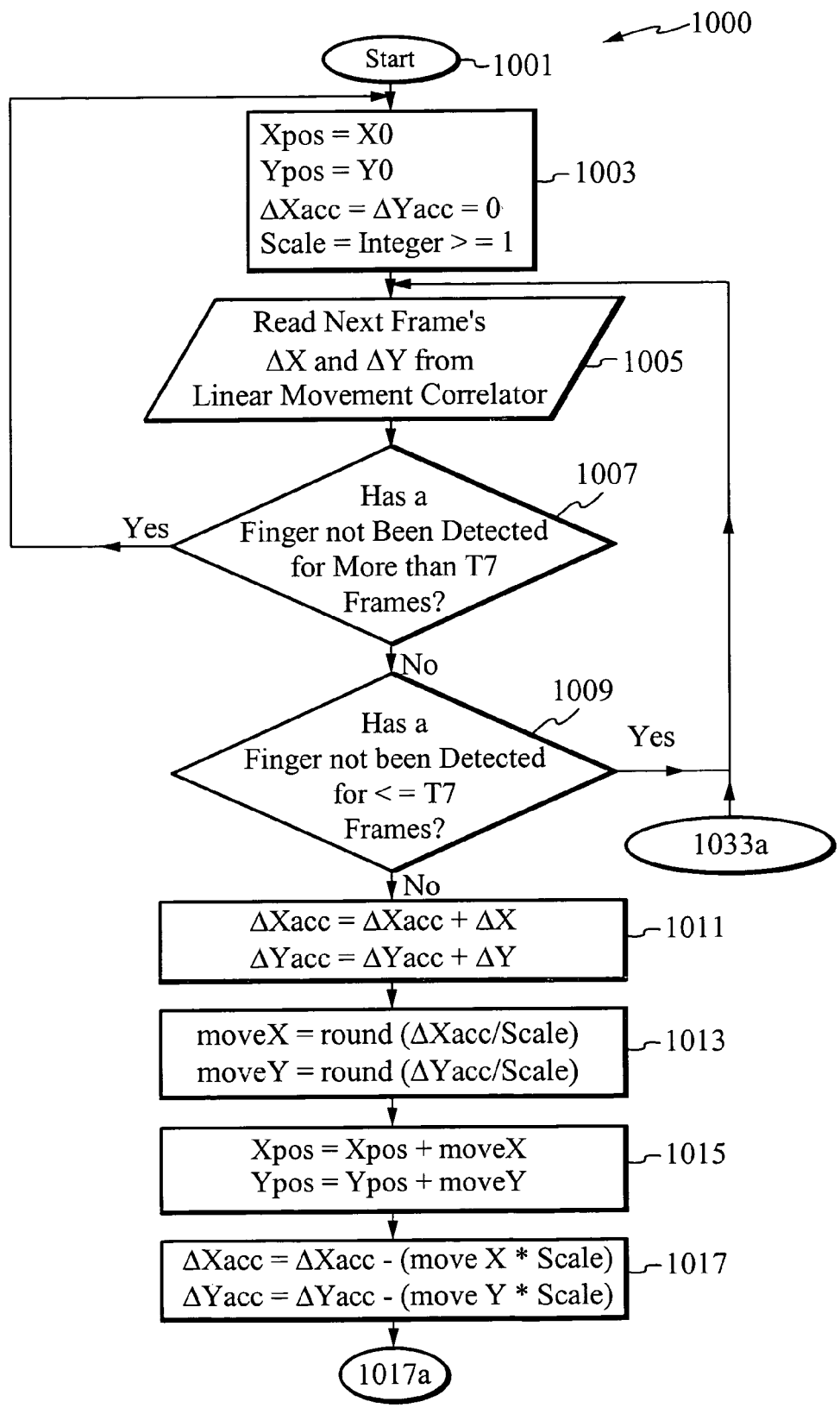
FIG. 10 is a flow chart illustrating the steps for determining the movement and direction for emulating a joystick in accordance with the present invention.
Figure 10B:
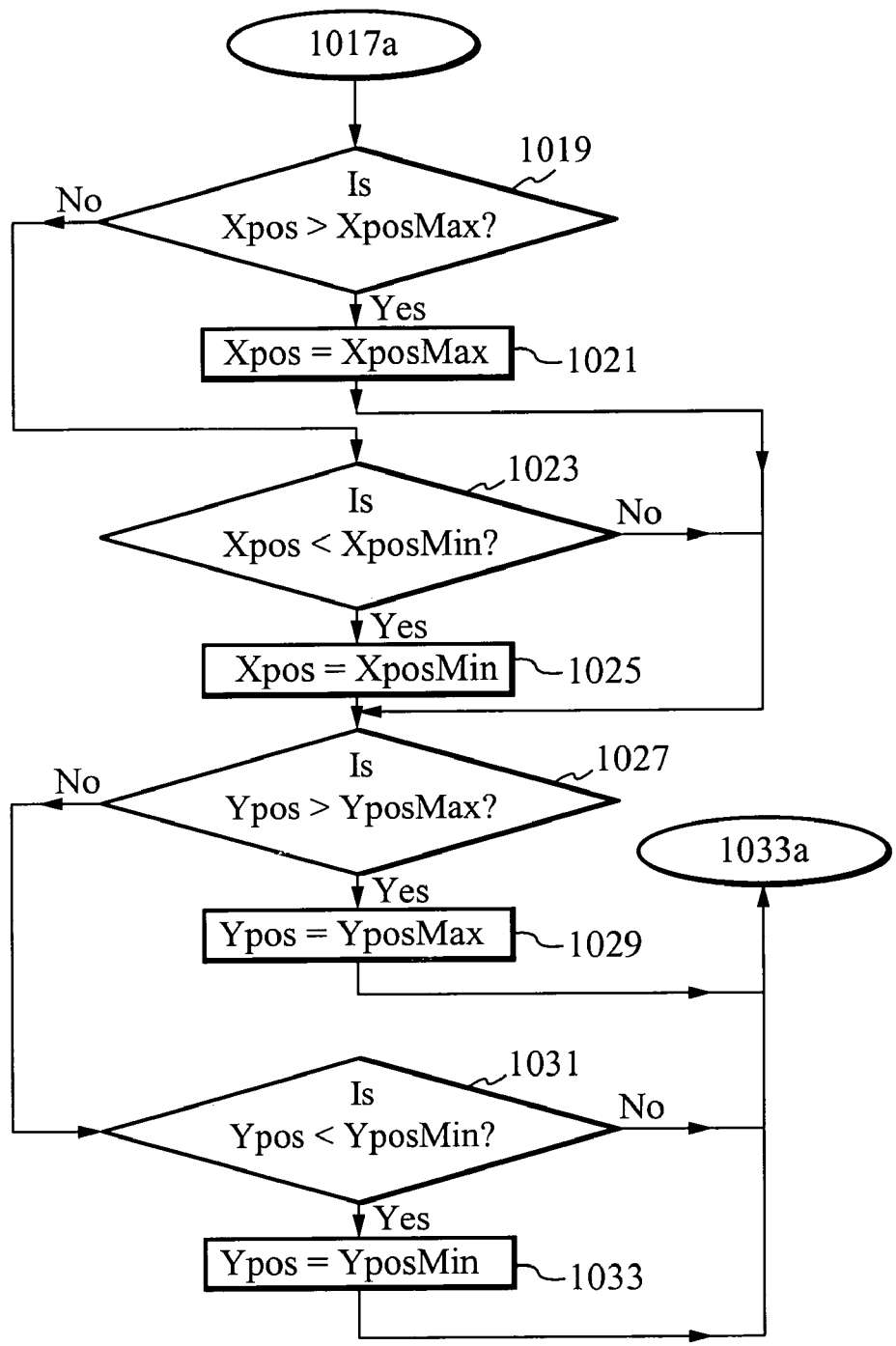

FIG. 10 illustrates the steps 1000 used to emulate a joystick in accordance with one embodiment of the present invention, performed by the Joystick emulator unit 123. After the start step 1001, an initialization step 1003 is performed. In the step 1003, the joystick position Xpos is set to x0, the joystick position Ypos is set to y0, the accumulators ΔXacc and ΔYacc are both set to 0, and scale is set to an integer greater than or equal to 1. In another embodiment, the scale is set to a floating point, with no loss of generality. Next, in the step 1005, the ΔX and ΔY of the next frame are read from the Linear Movement Correlator 113 of FIG. 1. Next, in the step 1007, it is determined whether a finger has not been detected on the swipe sensor 101 for more than T7 frames, where T7 is a predetermined value selected for the application at hand. If a finger has not been detected for more than T7 frames, processing loops back to the step 1003; otherwise, processing continues to the step 1009. In the step 1009, it is determined whether a finger has not been detected for T7 frames or less. If a finger has not been detected for T7 frames or less, processing loops back to the step 1005. Otherwise, processing continues to the step 1011.

It will be appreciated that variables other than frame units can be used in accordance with the present invention. In one embodiment, for example, time units rather than frame units are used to determine whether to loop from the step 1007 to the step 1003. In this example, if a finger has not been detected for at least a specified number of time units (e.g., 10 clock units), the process loops from the step 1007 to 1003.

Still referring to FIG. 10, in the step 1011, the value ΔXacc is set to ΔXacc+ΔX, and the value ΔYacc is set to ΔYacc+ΔY. Next, in the step 1013, the value moveX is set to ΔXacc/Scale, rounded to the nearest integer, and the value moveY is set to ΔYacc/Scale, also rounded to the nearest integer. Next, in the step 1015, the variable Xpos is set to Xpos+moveX, and the variable Ypos is set to Ypos+moveY. Next, in the step 1017, the variable ΔXacc is set to ΔXacc−(moveX*Scale), and the variable ΔYacc is set to ΔYacc−(moveY*Scale). In this step 1017, the remainders of each division are kept.

Next, in the step 1019, Xpos is compared to XposMax. If Xpos is greater than XposMax, then processing continues to the step 1021; otherwise, processing continues to the step 1023. In the step 1021, Xpos is set to XposMax, and processing continues to the step 1027. In the step 1023, Xpos is compared to XposMin. If Xpos is less than XposMin, then processing continues to the step 1025; otherwise, processing continues to the step 1027. In the step 1025, Xpos is set to XposMin, and processing continues to the step 1027.

In the step 1027, Ypos is compared to YposMax. Ypos is greater than YposMax, then processing continues to the step 1029; otherwise, processing continues to the step 1031. In the step 1029, Ypos is set to YposMax, and processing loops back to the step 1005. In the step 1031, Ypos is compared to YposMin. If Ypos is less than YposMin, then processing continues to the step 1033; otherwise, processing continues to the step 1005. In the step 1033, Ypos is set to YposMin, and processing continues to the step 1005.

It will be appreciated that values for XposMax, XposMin, YposMax, and YposMin are system dependent and can be set at start-up. XposMax reflects the maximum x value that an object can have on a display coupled to or forming part of the system 100 of FIG. 1. XposMin reflects the minimum x value, YposMax the maximum y value, and YposMin the minimum y value.

The steps 1000 center automatically and instantly after the finger is not detected on the swipe sensor 101 for some number of frames more than T7. In another embodiment the emulated joystick (e.g., the output produced by the steps 1000) returns to center more slowly using a simulation of a physical spring-mass or spring-mass-damper combination. For example, the emulated joystick returns in a straight line to the center position over one second or other similar time values so that the return movement is visible to the user.

In another embodiment, the emulated joystick tends to return to center slowly if the Pressure Info 135 returned by the Finger Pressure Detector 114 is below a certain threshold, with that tendency increasing as the finger pressure decreases. In other words, the speed of the return movement is proportional to the amount of pressure reduced by the finger. The more pressure reduced in a unit of time, the faster the return speed will become. If the pressure is reduced to zero, the joystick is centered immediately.

In another embodiment, the emulated joystick (e.g., the output produced by the steps) will be configured to return to some home position other than the center, with that home position defined dynamically by software or hardware.

It will be appreciated that the use of a spring-mass-damper system described in accordance with the embodiments of the present invention allows the simulation of a variety of functions and responses including, but not limited to: decreasing the velocity of an onscreen object, overshooting an onscreen home position, oscillating around the home position, or any combination of these. The system simulates a physically intuitive behavior, such as when a sprung and damped joystick is released, or when a car in a turn has its steering wheel released.

Another common type of game controller is analogous to a car steering wheel or aircraft control yoke. A steering wheel emits a value corresponding to its rotational position. A steering wheel may have an automatic centering mechanism provided by a spring or spring-damper combination and/or force feedback provided by a motor or other actuator such that it returns to a home position when released by the user.

Figure 11:
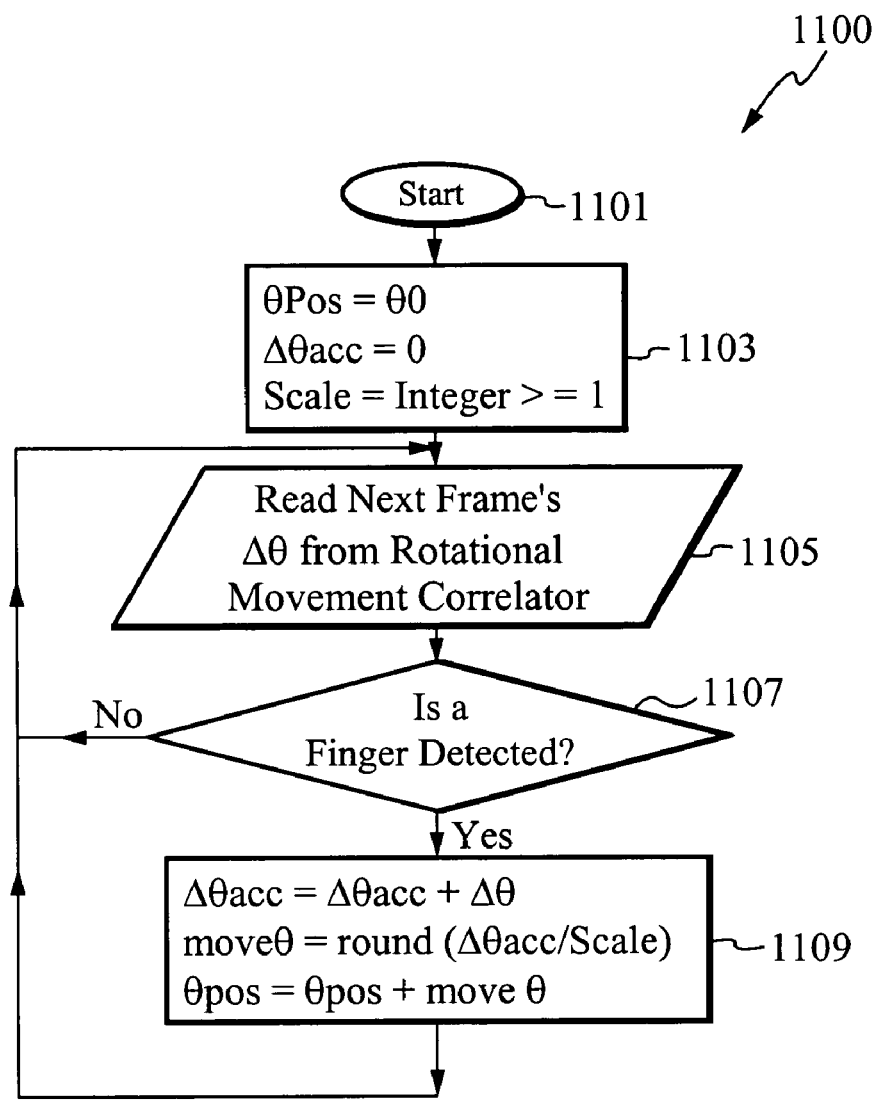
FIG. 11 is a flow chart illustrating the steps for determining the movement for emulating a steering wheel in accordance with the present invention.

One embodiment of the present invention emulates a steering wheel by capturing finger rotation from the Rotational Movement Correlator 112. The rotational movement ΔΘ132, generated by the Rotational Movement Correlator 112, scale at a certain ratio to map to the rotation angle of the steering wheel. FIG. 11 illustrates steps 1100 used to emulate a steering wheel in accordance with the present invention.

Referring to FIG. 11, after the start step 1101, the system proceeds to the initialization step 1103. In the step 1103, the angular position Θpos is set to Θ0. Θ0 is preferably 0 degrees but can be any predetermined value. Also in the step 1103, the accumulator ΔΘacc is set to 0, and Scale is initialized to an integer greater than or equal to 1. In other embodiments, Scale is set to a floating point value without any loss of generality.

Next, in the step 1105, the ΔΘ of the next frame is read from the Rotational Movement Correlator 112. Next, in the step 1107, it is determined whether a finger has been detected on the swipe sensor 101. If a finger has been detected, processing continues to the step 1109; otherwise, processing loops back to the step 1105.

In the step 1109, the value ΔΘacc is set to ΔΘacc+ΔΘ, the value moveΘ is set to ΔΘ/Scale rounded to the nearest integer, Θpos is set to Θpos+moveΘ, and processing loops back to the step 1105.

One embodiment includes an automatic centering behavior to refine the methods described above. The emulated steering wheel returns immediately to the center after the finger is not detected on the swipe sensor 101 for some number of frames.

In another embodiment, the emulated steering wheel returns to center more slowly using a simulation of a physical spring-mass or spring-mass-damper combination, or a physical simulation appropriate to a vehicle. For example, the emulated steering wheel rotates back to the center position over one second or other similar time values so that the return movement is visible to the user.

In another embodiment, the emulated steering wheel returns to center slowly if the finger pressure returned by the Finger Pressure Detector 114 is below a certain threshold, with that tendency increasing as the finger pressure decreases. In other words, the speed of the return rotation is positively related to the amount of pressure reduced by the finger. The more pressure reduced in a unit of time, the faster the return speed will become. If the pressure is reduced to zero, the steering wheel is centered immediately.

In yet another embodiment, the emulated steering wheel returns to some home position other than the center, with that home position defined dynamically by software or hardware.

Pressure-sensitive buttons are widely used in game consoles. The applied pressure is used in certain game environments such as racecar deceleration when applying brakes, or firing frequencies in war games. In accordance with the present invention, the analog nature of a pressure sensitive button can be emulated through the Pressure Detector 114. The initial output of Pressure Detector 114, when no finger is present, is set to zero. The Pressure Detector 114 can be calibrated with the applied finger pressure in a defined range. When emulating a pressure sensitive button, the output from Pressure Detector 114 will correspond to the applied pressure.

Finger image sensors and related software are typically capable of capturing and processing fingerprint images for the purpose of verifying the identity of a user. Since authentication is not needed for user input purposes, we further innovate by developing a finger image sensor for use solely as an input device and would not be used for fingerprint image reconstruction or fingerprint authentication.

Most finger image sensors available in the market, designed primary for authentication, have a typical resolution between 300 to 500 dots per inch (dpi). Embodiments of the present invention require finger image sensors with a resolution at or below 250 dpi for the purpose of user input control. The lower resolution is particularly important to capacitive finger image sensors. For the same silicon die size, a finger image sensor with a lower resolution means each capacitive cell is larger, resulting in a higher sensitivity for broader kinds of finger skin surface. If the capacitive cell and hence the sensitivity are kept the same, then the overall silicon die size will be smaller, resulting in a lower cost finger image sensor. These lower cost sensors are likely to help adoption of using finger image sensors as user input control devices.

The above examples are used merely to illustrate embodiments of the invention and are not intended to limit the scope of the invention. It will be appreciated that the embodiments can be modified in many ways. For example, device emulators can generate outputs different from those described above. A mouse emulator in accordance with the present invention can generate x and y overflows indicating that a mouse moved more than a pre-determined number of pulses in a given time. It will be readily apparent to one skilled in the art that various modifications may be made to the embodiments without departing from the spirit and scope of the invention as defined by the appended claims.

We claim:

1. A method of emulating multiple electronic input devices comprising:
   a. calculating a difference between first patterned image data and second patterned image data using row-based correlation, wherein the row-based correlation comprises obtaining a correlation measure between a single row of the first patterned image data and a single row of the second patterned image data;
   b. translating the difference into linear movement and multiple signals corresponding to output signals of multiple electronic input devices, thereby emulating the multiple electronic input devices, wherein the multiple electronic input devices comprise any two or more of a mouse, a joystick, a navigation bar, and a scroll wheel; and
   c. converting the difference into rotational movement and signals of at least one electronic input device that utilizes rotational movement and is different from the multiple electronic input devices.

2. The method of claim 1, wherein the first patterned image data corresponds to an image of a patterned object at a first position and the second patterned image data corresponds to an image of the patterned object at a second position.

3. The method of claim 2, further comprising reading the image of the patterned object at the first position and reading the image of the patterned object at the second position.

4. The method of claim 3, wherein the image of the patterned object comprises a fingerprint image.

5. The method of claim 4, wherein reading the image of the patterned object at the first and second positions comprises swiping a finger across a finger swipe sensor.

6. The method of claim 4, wherein reading the image of the patterned object at the first and second positions comprises placing a finger onto a finger placement sensor.

7. The method of claim 4, further comprising sensing a presence of the patterned object on a finger sensor.

8. The method of claim 7, wherein the presence is determined from a history of variance of patterned image data.

9. The method of claim 7, wherein the difference between the first patterned image data and the second patterned image data comprises a linear difference.

10. The method of claim 9, wherein translating the difference comprises mapping the linear difference into movement for controlling an onscreen object on a display.

11. The method of claim 10, wherein mapping the linear difference comprises smoothing the linear difference, filtering the linear difference, non-linearly scaling the linear difference, or a combination of these.

12. The method of claim 11, wherein a scaling factor is based on a speed with which the patterned object is moved across a surface of the finger sensor.

13. The method of claim 11, wherein the scaling factor is determined dynamically, based on a pre-determined number of positions of the patterned object on the finger sensor.

14. The method of claim 11, wherein the multiple signals and the signals of at least one electronic input device that utilizes rotational movement automatically returns the onscreen object to a home position on the display.

15. The method of claim 10, wherein the movement for controlling on onscreen object corresponds to rotational movement.

16. The method of claim 2, further comprising storing and timestamping data corresponding to rotational movement of the patterned object, linear movement of the patterned object, clicks, double-clicks, pressure changes of the patterned object on a finger sensor, presence of the patterned object on a finger sensor, and any combination of these before transmitting the multiple sets of output signals to a host system.

17. The method of claim 1, wherein translating the difference into the multiple signals comprises:
   c. comparing the linear movement in a direction to a pre-determined threshold, the direction being one of a plurality of directions controllable by a navigation bar;
   d. generating signals corresponding to a movement of an onscreen object by a unit of motion in a direction controllable by the navigation bar when the linear movement exceeds the threshold; and
   e. repeating steps c and d for remaining plurality of directions controllable by the navigation bar.

18. The method of claim 1, further comprising switching to a host system one or more output signals of only one of the multiple electronic input devices and the at least one electronic input device that utilizes rotational movement.

19. The method of claim 18, wherein the display forms part of a host device, the host device selected from the group consisting of a portable computer, a personal digital assistant, a portable telephone, a portable gaming device, a biometric/health monitor, and a digital camera.

20. The method of claim 1, further comprising storing and timestamping the first and second patterned image data.

21. The method of claim 1, further comprising translating the difference into a change in pressure of a patterned object on a surface of a finger sensor and output signals of a pressure-sensitive button.

22. The method of claim 21, wherein the change in pressure is determined by a presence of the patterned object in discrete regions of the finger sensor.

23. The method of claim 21, wherein the change in pressure is determined by a weighted average of regional patterned object presence data, smoothed average of patterned image data, and smoothed variance of patterned image data.

24. The method of claim 1, wherein the at least one electronic input device that utilizes rotational movement comprises a steering wheel.

25. A system for generating signals of multiple electronic input devices, the system comprising:
   a. a biometric image sensor configured to read first and second patterned images;
   b. a first module configured to determine differences between the patterned images using row-based correlation, wherein the row-based correlation comprises obtaining a correlation measure between a single row of the first patterned image and a single row of the second patterned image; and
   c. a second module configured to convert the differences into linear movement and output signals of multiple electronic input devices and into rotational movement and output signals of at least one electronic input device that utilizes rotational movement and is different from the multiple electronic input devices, wherein the multiple electronic input devices comprise any two or more of a mouse, a joystick, a navigation bar, and a scroll wheel.

26. The system of claim 25, wherein the biometric image sensor is a finger sensor.

27. The system of claim 26, wherein the finger sensor comprises a finger swipe sensor.

28. The system of claim 27, wherein the finger swipe sensor comprises a finger sensor selected from the group consisting of a capacitive sensor, an optical sensor, and a thermal sensor.

29. The system of claim 27, wherein the finger swipe sensor has a resolution of less than 250 dots per inch.

30. The system of claim 26, wherein the finger sensor comprises a finger placement sensor.

31. The system of claim 26, wherein the first module is further configured to detect a pressure of an object on a surface of the biometric image sensor from the first and second patterned images, and the second module is further configured to convert the pressure into a pressure metric.

32. The system of claim 26, wherein the first module comprises a pressure detector coupled to the biometric image sensor.

33. The system of claim 32, wherein the second module comprises a pressure sensitive button emulator unit coupled to the pressure detector unit and the patterned image presence detector.

34. The system of claim 32, wherein the pressure detector is configured to determine a pressure by computing a weighted average of regional patterned image presence data, smoothed average, and smoothed variance between patterned image movement information.

35. The system of claim 26, wherein the first module comprises a patterned image presence detector coupled to the biometric image sensor.

36. The system of claim 35, wherein the patterned image presence detector comprises a finger presence detector.

37. The system of claim 35, wherein the first module further comprises a rotational movement correlator coupled to the biometric image sensor.

38. The system of claim 37, wherein the second module comprises a steering wheel emulator unit coupled to the rotational movement correlator, the linear movement correlator, and the patterned image presence detector, wherein the rotational movement correlator is configured to translate a change in position of a read patterned image into an angle of rotation.

39. The system of claim 35, wherein the second module comprises a mouse emulator unit coupled to the linear movement correlator and the patterned image presence detector.

40. The system of claim 35, wherein the second module comprises a joystick emulator unit coupled to the linear movement correlator and the patterned image presence detector.

41. The system of claim 35, wherein the second module comprises a navigation bar emulator unit coupled to the linear movement correlator and the patterned image presence detector.

42. The system of claim 35, wherein the second module comprises a scroll wheel emulator unit coupled to the linear movement correlator and the patterned image presence detector.

43. The system of claim 35, wherein the patterned image presence detector is configured to compare the variance of raw patterned image data with a first threshold value and a second threshold value to determine a presence of a patterned image on the biometric image sensor.

44. The system of claim 25, wherein the first module comprises a linear movement correlator configured to calculate a linear difference between the first and second patterned images using a row-based correlation algorithm.

45. The system of claim 44, wherein the second module is further configured to smooth linear differences, filter linear differences, non-linearly scale linear differences, or any combination of these, thereby generating signals for controlling an onscreen object.

46. The system of claim 25, further comprising a time interval accumulator coupling the biometric image sensor to the first module.

47. The system of claim 25, further comprising a display for presenting an onscreen object controllable by one or more of the output signals of the multiple electronic input devices and the at least one electronic input device that utilizes rotational movement.

48. The system of claim 47, wherein the biometric image sensor, the first module, and the second module form part of an integral host device.

49. The system of claim 48, wherein the host device is a device selected from the group consisting of a portable computer, a personal digital assistant, a portable telephone, a portable gaming device, a biometric/health monitor, and a digital camera.

50. A system for generating signals of multiple electronic input devices, the system comprising:
   a finger sensor configured to read first and second patterned images;
   a first module configured to determine a presence of an object on the finger sensor and to determine linear differences between the first and second patterned images using row-based correlation, wherein the row-based correlation comprises obtaining a correlation measure between a single row of the first patterned image and a single row of the second patterned image; and
   a second module configured to convert the linear differences into linear movement and output signals of multiple electronic input devices for controlling a computer object, the second module further configured to convert the linear differences into rotational movement and output signals of at least one electronic input device that utilizes rotational movement data and is different from the multiple electronic input devices, wherein the multiple electronic input devices comprise any two or more of a mouse, a joystick, a navigation bar, and a scroll wheel.

* * * * *

UNITED STATES PATENT AND TRADEMARK OFFICE
CERTIFICATE OF CORRECTION

PATENT NO. : 7,474,772 B2 Page 1 of 1
APPLICATION NO. : 10/873393
DATED : January 6, 2009
INVENTOR(S) : Russo et al.

It is certified that error appears in the above-identified patent and that said Letters Patent is hereby corrected as shown below:

IN THE SPECIFICATION

At column 8, line 22, please replace "122" with "112" so that the corresponding sentence reads -- As described in more detail below, the Rotational Movement Correlator 112 takes successive frames of image data and uses correlation methods to translate them into an angle of rotation generated on its output line 132. --

IN THE CLAIMS

At column 22, line 2, please replace "on" with "an" so that the corresponding sentence reads -- The method of claim 10, wherein the movement for controlling an onscreen object corresponds to rotational movement. --

Signed and Sealed this

Twenty-fourth Day of March, 2009

JOHN DOLL
*Acting Director of the United States Patent and Trademark Office*